United States Patent
Kusaki et al.

(10) Patent No.: US 12,018,442 B2
(45) Date of Patent: Jun. 25, 2024

(54) GROUND INFORMATION DETECTION METHOD, GROUND INFORMATION DETECTION SYSTEM, GROUND INFORMATION DETECTION PROGRAM, AND PROFILE

(71) Applicant: MR Support Inc., Kyoto (JP)

(72) Inventors: Shigeo Kusaki, Kyoto (JP); Takamitsu Mori, Kyoto (JP)

(73) Assignee: MR Support Inc., Kyoto (JP)

( * ) Notice: Subject to any disclaimer, the term of this patent is extended or adjusted under 35 U.S.C. 154(b) by 289 days.

(21) Appl. No.: 17/619,342

(22) PCT Filed: Apr. 7, 2020

(86) PCT No.: PCT/JP2020/015699
§ 371 (c)(1),
(2) Date: Dec. 15, 2021

(87) PCT Pub. No.: WO2020/255540
PCT Pub. Date: Dec. 24, 2020

(65) Prior Publication Data
US 2022/0235522 A1  Jul. 28, 2022

(30) Foreign Application Priority Data

Jun. 17, 2019 (JP) .................... 2019-112107
Jun. 17, 2019 (JP) .................... 2019-112108
Nov. 18, 2019 (JP) .................... 2019-208282

(51) Int. Cl.
*E01C 23/01* (2006.01)
*G01S 17/89* (2020.01)
(Continued)

(52) U.S. Cl.
CPC .............. *E01C 23/01* (2013.01); *G01S 17/89* (2013.01); *G06T 7/70* (2017.01); *G06T 7/90* (2017.01);
(Continued)

(58) Field of Classification Search
CPC ............. G06T 7/70; G06T 7/90; G06T 17/05; G06T 17/20; G06T 19/20; G06T 2207/10024;
(Continued)

(56) References Cited

U.S. PATENT DOCUMENTS

2013/0046471 A1* 2/2013 Rahmes ................. G01S 17/88
702/5
2017/0309050 A1 10/2017 Sasaki et al.
(Continued)

FOREIGN PATENT DOCUMENTS

JP        9-101129 A     4/1997
JP     2004-325411 A    11/2004
(Continued)

OTHER PUBLICATIONS

Office Action dated Mar. 14, 2023, issued in counterpart JP Application No. 2019-208282, with English translation. (4 pages).
(Continued)

*Primary Examiner* — Kee M Tung
*Assistant Examiner* — Jed-Justin Imperial
(74) *Attorney, Agent, or Firm* — WHDA, LLP

(57) ABSTRACT

The ground information about the uneven state of the ground is easily detected. A ground information detection method according to the present invention includes: a point group data acquisition step for acquiring point group data generated as three-dimensional coordinates for each point on the ground with laser light emitted from a three-dimensional scanning device installed at a known point; and a ground information detection step for detecting ground information
(Continued)

about an uneven state of the ground using the point group data acquired at the point group data acquisition step.

20 Claims, 30 Drawing Sheets

(51) Int. Cl.
  *G06T 7/70* (2017.01)
  *G06T 7/90* (2017.01)
  *G06T 17/05* (2011.01)
  *G06T 17/20* (2006.01)
  *G06T 19/20* (2011.01)
  *G06V 10/56* (2022.01)
  *G06V 20/10* (2022.01)

(52) U.S. Cl.
  CPC .............. *G06T 17/05* (2013.01); *G06T 17/20* (2013.01); *G06T 19/20* (2013.01); *G06V 10/56* (2022.01); *G06V 20/182* (2022.01); *G06T 2207/10024* (2013.01); *G06T 2207/10028* (2013.01); *G06T 2210/56* (2013.01); *G06T 2219/2012* (2013.01)

(58) Field of Classification Search
  CPC ....... G06T 2207/10028; G06T 2210/56; G06T 2219/2012; G01S 17/89; G06V 10/56; G06V 20/182; E01C 23/01
  See application file for complete search history.

(56) References Cited

U.S. PATENT DOCUMENTS

2018/0284234 A1* 10/2018 Curatu .................. G01S 7/4817
2022/0205809 A1* 6/2022 Mayster ............ G01C 21/3807

FOREIGN PATENT DOCUMENTS

| JP | 2013-113702 A | 6/2013 |
| JP | 2013171455 A | 9/2013 |
| JP | 2014-163707 A | 9/2014 |
| JP | 2015-31018 A | 2/2015 |
| JP | 2017-138238 A | 8/2017 |

OTHER PUBLICATIONS

International Search Report dated Jun. 23, 2020, issued in counterpart International Application No. PCT/JP2020/015699 (2 pages).
Office Action dated Oct. 25, 2022, issued in counterpart JP application No. 2019-112108 with English translation. (11 pages).
Office Action dated Mar. 28, 2023, issued in counterpart JP Application No. 2019-112108, with English translation. (6 pages).

* cited by examiner

NUMERIC VALUE
(SIZE OF AREA SURROUNDED BY LINE $A_{a1}$)

NUMERIC VALUE
(SIZE OF AREA SURROUNDED BY LINE $A_{a2}$)

LIGHT WARM COLOR

LIGHT COLD COLOR

FIG.28

| No. | LATITUDE | LONGITUDE | HEIGHT |
|---|---|---|---|
| 1 (START POINT) | a(1) | b(1) | c(1) |
| 2 | a(2) | b(2) | c(2) |
| 3 | a(3) | b(3) | c(3) |
| ⋮ | ⋮ | ⋮ | ⋮ |
| n (END POINT) | a(n) | b(n) | c(n) |

GROUND INFORMATION DETECTION METHOD, GROUND INFORMATION DETECTION SYSTEM, GROUND INFORMATION DETECTION PROGRAM, AND PROFILE

TECHNICAL FIELD

The present invention relates to a ground information detection method, a ground information detection system, a ground information detection program, and a profile for detecting for example an uneven state of a road surface.

BACKGROUND ART

Conventionally, when there is a damage such as depression on the surface of asphalt pavement, which forms the surface layer of a road, etc., repair is conducted using, for example, a cutting overlay method. According to this repair method, a surface layer portion of the existing asphalt pavement is cut and removed with a road surface cutting machine, and then new asphalt is laid to construct a new surface layer.

In order to repair a road, it is necessary to inspect the uneven state of the road surface and, conventionally the road surface is visually inspected by an inspector; however, the work of inspecting the road surface and measuring the amount of depression by each inspector is very complicated. Therefore, there is a road surface measurement device that automatically measures the amount of depression instead of measuring the amount of depression by an inspector (see Patent Document 1). With the road surface measurement device, a reference surface is set based on a measurement result, and the amount of depression of the road surface is calculated with respect to the reference surface.

Roads need to be repaired because of the unevenness caused by the passage of vehicles and the like and, in order to conduct repair, it is necessary to obtain the data on the uneven state of the road surface. Therefore, when the road is repaired, a three-dimensional scanner is installed around the road to emit laser light to the road surface and acquire point group data for each point on the road surface.

With regard to the uneven state of road surfaces, international roughness index (IRI) is known as an index indicating the unevenness of road surfaces for evaluating the ride quality of automobiles. The calculation of the international roughness index needs a longitudinal profile of a road surface, and the longitudinal profile represents a cross-section (changes in the height of the road surface) along a longitudinal direction of the road. The calculation of the international roughness index is typically processed by a computer using a calculation program by the use of the longitudinal profile of the road surface. One of the typical examples of this program is software called Proval.

The longitudinal profile of the road surface including data on changes in the height indicating the unevenness of the road surface is measured by a profilometer that is moved by a surveyor along the target road to be measured (see Patent Document 2). The longitudinal profile of the road surface may also be measured by driving a road surface condition survey vehicle on the target road to be measured.

PRIOR ART DOCUMENT

Patent Document

Patent Document 1: Japanese Unexamined Patent Application Publication No. 9-101129

Patent Document 2: Japanese Unexamined Patent Application Publication No. 2004-325411

SUMMARY OF THE INVENTION

Technical Problem

A repair plan surface for the actual repair is typically planned such that, for example, the slope of the road surface has a predetermined slope angle and is completely different from the reference surface based on the measurement result of the road surface at the time of start of repair as in a conventional manner. Therefore, even when the amount of depression of the road surface with respect to the reference surface based on the road surface state at the time of start of repair is calculated, it is uncertain whether the reference surface is appropriate, and it is difficult to accurately specify the repair location that needs to be repaired at the time of start of repair. Furthermore, it is difficult to accurately detect the amount of depression of the road surface, and it is impossible to accurately predict the material cost (e.g., the amount of asphalt) needed for repair to eliminate depression of the road surface at the time of start of repair. It is also difficult to accurately predict the cutting volume when repair is conducted by the cutting overlay method.

The present invention has been made with a focus on such an issue and has an object to provide a ground information detection method, a ground information detection system, and a ground information detection program with which it is possible to accurately determine the state of a road surface at the time of start of repair when, for example, repair is conducted to eliminate depression of the road surface.

It takes a lot of time and effort to acquire the longitudinal profile of the road surface for both the measurement by the surveyor and the measurement by the road surface condition survey vehicle. In particular, the measurement by the road surface condition survey vehicle described above is expensive. Longitudinal profiles based on the measurement by the surveyor and the measurement by the road surface condition survey vehicle have low accuracy as compared with longitudinal profiles based on leveling survey.

The present invention has been made with a focus on such an issue and has an object to provide a ground information detection method, a ground information detection system, a ground information detection program, and a profile with which a highly accurate profile may be easily obtained.

Solution to Problem

In order to solve such an issue, the present invention has the following measures.

Specifically, a ground information detection method according to the present invention includes: a point group data acquisition step for acquiring point group data generated as three-dimensional coordinates for each point on a ground with laser light emitted from a three-dimensional scanning device installed at a known point; and a ground information detection step for detecting ground information about an uneven state of the ground by using the point group data acquired at the point group data acquisition step.

A ground information detection system according to the present invention includes a three-dimensional scanning device that is installed at a known point to emit laser light and thus acquires point group data generated as three-dimensional coordinates for each point on a ground; and a ground information detection means that detects ground information about an uneven state of the ground by using the point group data acquired by the three-dimensional scanning device.

Accordingly, with the ground information detection method and the ground information detection system according to the present invention, for example, ground information about the uneven state of the ground may be easily detected when the ground is repaired.

In the ground information detection method according to the present invention, the point group data acquisition step acquires point group data generated as three-dimensional coordinates for each point in a predetermined area of a road surface at time of start of repair with the laser light emitted from the three-dimensional scanning device installed at the known point, and the ground information detection step includes: a reference surface data acquisition step for acquiring, as reference surface data, any of plan surface data indicating a repair plan surface for repairing the predetermined area, road surface data when the predetermined area has been newly provided, and road surface data when the predetermined area has been repaired; and an elevation difference calculation step for calculating an elevation difference for each identical plane position in the predetermined area based on the point group data acquired at the point group data acquisition step and the reference surface data acquired at the reference surface data acquisition step.

In the ground information detection system according to the present invention, the ground information detection means includes: a point group data storage means that stores point group data generated as three-dimensional coordinates for each point in a predetermined area of a road surface at time of start of repair, acquired by the three-dimensional scanning device; a reference surface data storage means that stores, as reference surface data, any of plan surface data indicating a repair plan surface for repairing the predetermined area, road surface data when the predetermined area has been newly provided, and road surface data when the predetermined area has been repaired; and an elevation difference calculation means that calculates an elevation difference for each identical plane position in the predetermined area based on the point group data stored in the point group data storage means and the reference surface data stored in the reference surface data storage means.

An elevation difference detection program according to the present invention, when loaded into a computer, causes the computer to function as: a point group data reception means that receives point group data generated as three-dimensional coordinates for each point in a predetermined area of a road surface at time of start of repair, acquired with laser light emitted from a three-dimensional scanning device installed at a known point; a reference surface data reception means that receives, as reference surface data, any of plan surface data indicating a repair plan surface for repairing the predetermined area, road surface data when the predetermined area has been newly provided, and road surface data when the predetermined area has been repaired; and an elevation difference calculation means that calculates an elevation difference for each identical plane position in the predetermined area based on the point group data received by the point group data reception means and the reference surface data received by the reference surface data reception means.

Accordingly, with the ground information detection method, the ground information detection system, and the elevation difference detection program according to the present invention, when the predetermined area of the road surface is repaired, the elevation difference at each plane position in the predetermined area is calculated based on the point group data and the reference surface data for each point of the road surface at the time of start of repair, and as any of plan surface data indicating a repair plan surface for repairing the predetermined area, road surface data when the predetermined area has been newly provided, and road surface data when the predetermined area has been repaired is used as the reference surface data, it is possible to accurately specify the repair location where a depression is formed on the road surface. Furthermore, it is possible to accurately detect the amount of depression on the road surface and to accurately predict the material cost needed for repair to eliminate the depression of the road surface at the time of start of repair. It is also possible to accurately predict the cutting volume when repair is conducted using the cutting overlay method.

The ground information detection method according to the present invention includes an image display step for displaying, on a display unit, a three-dimensional image based on the point group data acquired at the point group data acquisition step; a first color determination step for determining a color corresponding to a magnitude of the elevation difference calculated at the elevation difference calculation step for each identical plane position in the predetermined area; and a first elevation difference color display step for adding the color determined at the first color determination step to the three-dimensional image displayed at the image display step to display the elevation difference in the predetermined area.

The ground information detection system according to the present invention includes: a display control means that displays, on a display unit, a three-dimensional image based on the point group data stored in the point group data storage means; and a first color determination means that determines a color corresponding to a magnitude of the elevation difference calculated by the elevation difference calculation means for each identical plane position in the predetermined area, and the display control means adds the color determined by the first color determination means to the three-dimensional image displayed on the display unit to display the elevation difference in the predetermined area.

Accordingly, with the ground information detection method and the ground information detection system according to the present invention, the elevation difference at each plane position in the predetermined area is displayed in the color corresponding to the magnitude thereof so that it is possible to easily determine the location where a depression is formed on the road surface and the amount of depression on the road surface.

The ground information detection method according to the present invention includes: an image display step for displaying, on a display unit, a three-dimensional image based on the point group data acquired at the point group data acquisition step; and an elevation difference line display step for displaying, on the three-dimensional image displayed at the image display step, a line indicating a portion having an identical elevation difference in the predetermined area in accordance with a magnitude of the elevation difference calculated at the elevation difference calculation step.

The ground information detection system according to the present invention includes a display control means that displays, on a display unit, a three-dimensional image based on the point group data stored in the point group data storage means, and the display control means displays, on the three-dimensional image displayed on the display unit, a line indicating a portion having an identical elevation difference in the predetermined area in accordance with a magnitude of the elevation difference calculated by the elevation difference calculation means.

Accordingly, with the ground information detection method and the ground information detection system according to the present invention, the area having the identical elevation difference in the predetermined area is displayed by a line so that it is possible to easily determine the location where a depression is formed on the road surface and the amount of depression on the road surface.

The ground information detection method according to the present invention includes: a designation step for designating a predetermined position in the predetermined area while the display unit displays the elevation difference in the predetermined area at the first elevation difference color display step or the elevation difference line display step; and a numerical value display step for displaying, on the display unit, at least either a numerical value indicating an elevation difference at the predetermined position or a numerical value indicating a size of an area surrounded by a line indicating a portion having an identical elevation difference near the predetermined position when the predetermined position has been designated at the designation step.

The ground information detection system according to the present invention includes a designation means that designates a predetermined position in the predetermined area while the display unit displays the elevation difference in the predetermined area, and the display control means displays, on the display unit, at least either a numerical value indicating an elevation difference at the predetermined position or a numerical value indicating a size of an area surrounded by a line indicating a portion having an identical elevation difference near the predetermined position when the designation means has designated the predetermined position.

Accordingly, with the ground information detection method and the ground information detection system according to the present invention, it is possible to numerically detect the elevation difference at the predetermined position in the predetermined area or the size of the area surrounded by a line indicating a portion having the identical elevation difference near the predetermined position.

The ground information detection method according to the present invention includes: a comparison step for comparing a magnitude of the elevation difference calculated at the elevation difference calculation step with a predetermined value for each identical plane position in the predetermined area; a first ratio calculation step for calculating, based on a comparison result at the comparison step, at least either a ratio of plane positions having the magnitude of the elevation difference more than the predetermined value or a ratio of plane positions having the magnitude of the elevation difference equal to or less than the predetermined value; and a first determination step for determining a state of the predetermined area based on the ratio calculated at the first ratio calculation step.

The ground information detection system according to the present invention includes: a comparison means that compares a magnitude of the elevation difference calculated by the elevation difference calculation means with a predetermined value for each identical plane position in the predetermined area; a first ratio calculation means that calculates, based on a comparison result by the comparison means, at least either a ratio of plane positions having the magnitude of the elevation difference more than the predetermined value or a ratio of plane positions having the magnitude of the elevation difference equal to or less than the predetermined value; and a first determination means that determines a state of the predetermined area based on the ratio calculated by the first ratio calculation means.

Accordingly, with the ground information detection method and the ground information detection system according to the present invention, based on a comparison result obtained by comparing the magnitude of the elevation difference with the predetermined value for each identical plane position in the predetermined area, a ratio of plane positions having the magnitude of the elevation difference more than the predetermined value or a ratio of plane positions having the magnitude of the elevation difference equal to or less than the predetermined value is calculated, and the state of the predetermined area is determined based on the ratio. Therefore, the state of the predetermined area is automatically determined, and there is no need for the inspector to determine the state of the predetermined area.

The ground information detection method according to the present invention includes: an image display step for displaying, on a display unit, a three-dimensional image based on the point group data acquired at the point group data acquisition step; a second color determination step for determining, for the each plane position, a color corresponding to either the plane position having the magnitude of the elevation difference more than the predetermined value or the plane position having the magnitude of the elevation difference equal to or less than the predetermined value; and a second elevation difference color display step for adding the color determined at the second color determination step to the three-dimensional image displayed at the image display step to display the elevation difference in the predetermined area.

The ground information detection system according to the present invention includes: a display control means that displays, on a display unit, a three-dimensional image based on the point group data stored in the point group data storage means; and a second color determination means that determines, for the each plane position, a color corresponding to either the plane position having the magnitude of the elevation difference more than the predetermined value or the plane position having the magnitude of the elevation difference equal to or less than the predetermined value, and the display control means adds the color determined by the second color determination means to the three-dimensional image displayed on the display unit by the display control means to display the elevation difference in the predetermined area.

Accordingly, with the ground information detection method and the ground information detection system according to the present invention, the plane position having the magnitude of the elevation difference more than the predetermined value and the plane position having the magnitude of the elevation difference equal to or less than the predetermined value are displayed in different colors so that the state of the predetermined area may be easily detected.

The ground information detection method according to the present invention includes: a comparison step for comparing a magnitude of the elevation difference calculated at the elevation difference calculation step with a predetermined value for each identical plane position in the predetermined area; a second ratio calculation step for calculating, based on a comparison result at the comparison step, at least either a ratio of plane positions that have a magnitude of the elevation difference more than the predetermined value and that have the magnitude of the elevation difference in a first predetermined range or a ratio of plane positions that have the magnitude of the elevation difference equal to or less than the predetermined value and that have the magnitude of the elevation difference in a second predetermined range; and a second determination step for determining a state of the predetermined area based on the ratio calculated at the second ratio calculation step.

The ground information detection system according to the present invention includes: a comparison means that compares a magnitude of the elevation difference calculated by the elevation difference calculation means with a predetermined value for each identical plane position in the predetermined area; a second ratio calculation means that calculates, based on a comparison result by the comparison means, at least either a ratio of plane positions that have the magnitude of the elevation difference more than the predetermined value and that have the magnitude of the elevation difference in a first predetermined range or a ratio of plane positions that have the magnitude of the elevation difference equal to or less than the predetermined value and that have the magnitude of the elevation difference in a second predetermined range; and a second determination means that determines a state of the predetermined area based on the ratio calculated by the second ratio calculation means.

Accordingly, with the ground information detection method and the ground information detection system according to the present invention, based on a comparison result obtained by comparing the magnitude of the elevation difference with the predetermined value for each identical plane position in the predetermined area, the ratio of plane positions that have the magnitude of the elevation difference in the first predetermined range or the ratio of plane positions that have the magnitude of the elevation difference in the second predetermined range is calculated, and the state of the predetermined area is determined based on the ratio. Therefore, the state of the predetermined area is automatically determined, and there is no need for the inspector to determine the state of the predetermined area.

The ground information detection method according to the present invention includes: an image display step for displaying, on a display unit, a three-dimensional image based on the point group data acquired at the point group data acquisition step; a third color determination step for determining, for the each plane position, a color corresponding to either the plane position having the magnitude of the elevation difference in the first predetermined range or the plane position having the magnitude of the elevation difference in the second predetermined range; and a third elevation difference color display step for adding, to the three-dimensional image displayed at the image display step, the color determined at the third color determination step to display the elevation difference in the predetermined area.

The ground information detection system according to the present invention includes: a display control means that displays, on a display unit, a three-dimensional image based on the point group data stored in the point group data storage means; and a third color determination means that determines, for the each plane position, a color corresponding to either the plane position having the magnitude of the elevation difference in the first predetermined range or the plane position having the magnitude of the elevation difference in the second predetermined range, and the display control means adds the color determined by the third color determination means to the three-dimensional image displayed by the image display means to display the elevation difference in the predetermined area.

Accordingly, with the ground information detection method and the ground information detection system according to the present invention, the plane position having the magnitude of the elevation difference in the first predetermined range and the plane position having the magnitude of the elevation difference in the second predetermined range are displayed in the corresponding colors so that the state of the predetermined area may be easily detected.

The ground information detection method according to the present invention includes: a comparison step for comparing a magnitude of the elevation difference calculated at the elevation difference calculation step with a predetermined value for each identical plane position in the predetermined area; a third ratio calculation step for calculating, based on a comparison result at the comparison step, a ratio of boundary portions between the plane position having the magnitude of the elevation difference more than the predetermined value and the plane position having the magnitude of the elevation difference equal to or less than the predetermined value; and a third determination step for determining a state of the predetermined area based on the ratio calculated at the third ratio calculation step.

The ground information detection system according to the present invention includes: a comparison means that compares a magnitude of the elevation difference calculated by the elevation difference calculation means with a predetermined value for each identical plane position in the predetermined area; a third ratio calculation means that calculates, based on a comparison result by the comparison means, a ratio of boundary portions between the plane position having the magnitude of the elevation difference more than the predetermined value and the plane position having the magnitude of the elevation difference equal to or less than the predetermined value; and a third determination means that determines a state of the predetermined area based on the ratio calculated by the third ratio calculation means.

Accordingly, with the ground information detection method and the ground information detection system according to the present invention, based on a comparison result obtained by comparing the magnitude of the elevation difference with the predetermined value for each identical plane position in the predetermined area, the ratio of boundary portions between the plane position having the magnitude of the elevation difference more than the predetermined value and the plane position having the magnitude of the elevation difference equal to or less than the predetermined value is calculated, and the state of the predetermined area is determined based on the ratio. Therefore, the state of the predetermined area is automatically determined, and thus there is no need for the inspector to determine the state of the predetermined area.

In the ground information detection method according to the present invention, the ground information detection step includes: an examination location designation step for designating a linear examination location on the ground; and a profile generation step for deriving, based on the point group data acquired at the point group data acquisition step, data corresponding to heights at a plurality of positions on the linear examination location designated at the examination location designation step to generate a profile for a cross-section of the ground.

In the ground information detection system according to the present invention, the ground information detection means includes: an examination location designation means that designates a linear examination location on the ground; and a profile generation means that derives, based on the point group data acquired by the three-dimensional scanning device, data corresponding to heights at a plurality of positions on the linear examination location designated by the examination location designation means to generate a profile for a cross-section of the ground.

A profile generation program according to the present invention, when loaded into a computer, causes the computer to function as: a point group data reception means that receives point group data generated as three-dimensional coordinates acquired for each point on a ground with laser light emitted from a three-dimensional scanning device installed at a known point; a designation information reception means that receives designation information designating a linear examination location on the ground; and a profile generation means that derives, based on the point group data received by the point group data reception means, data corresponding to heights at a plurality of positions on the linear examination location designated by the designation information received by the designation information reception means to generate a profile for a cross-section of the ground.

Accordingly, with the ground information detection method, the ground information detection system, and the profile generation program according to the present invention, the profile (indicating changes in the height of the ground) for the cross-section of the ground is generated based on the three-dimensional point group data that is typically acquired when the ground is repaired. Therefore, it does not need to take a lot of time and effort to acquire the profile for the cross-section of the ground, as it is not necessary to conduct the measurement by the surveyor and the measurement by the road surface condition survey vehicle. In particular, the cost may be reduced as the measurement by the road surface condition survey vehicle is not needed. The profile obtained according to the present invention is more accurate than the profile based on the measurement by the surveyor or the measurement by the road surface condition survey vehicle and is as accurate as the profile based on leveling survey.

In the ground information detection method according to the present invention, the profile generation step derives, based on the point group data acquired at the point group data acquisition step, data corresponding to a latitude, longitude, and height at a plurality of positions on the linear examination location designated at the examination location designation step to generate the profile.

In the ground information detection system according to the present invention, the profile generation means derives, based on the point group data acquired by the three-dimensional scanning device, data corresponding to a latitude, longitude, and height at a plurality of positions on the linear examination location designated by the examination location designation means to generate the profile.

A profile according to the present invention includes point group data acquired with laser light emitted from a three-dimensional scanning device installed at a known point and includes data that is derived based on the point group data generated as three-dimensional coordinates for each point on a ground and that corresponds to a latitude, longitude, and height at a plurality of positions on a predetermined linear examination location.

Accordingly, with the ground information detection method and the ground information detection system according to the present invention, a profile is generated based on the data corresponding to the latitude, longitude, and height at the plurality of positions on the linear examination location. Therefore, the position of the profile may be specified based on the latitude and the longitude.

With the ground information detection method according to the present invention, the profile generation step converts the point group data acquired at the point group data acquisition step into a three-dimensional triangulated irregular network (TIN) model, which is a collection of triangular planes connected with the point group data as vertices, and derives data at the plurality of positions on the linear examination location to generate the profile.

With the ground information detection system according to the present invention, the profile generation means converts the point group data acquired by the three-dimensional scanning device into a three-dimensional triangulated irregular network (TIN) model, which is a collection of triangular planes connected with the point group data as vertices, and derives data at the plurality of positions on the linear examination location to generate the profile.

Accordingly, with the ground information detection method and the ground information detection system according to the present invention, even when the point group data at the linear examination location is not included in the point group data acquired by the three-dimensional scanning device, the profile at the linear examination location may be generated based on the point group data around the linear examination location. A reduction in the point group data acquired by the three-dimensional scanning device causes a reduction in the amount of data.

With the ground information detection method according to the present invention, the point group data acquisition step acquires point group data generated as three-dimensional coordinates for each point in a longitudinal direction of a road surface, and the profile generation step generates a longitudinal profile of the road surface.

In the ground information detection system according to the present invention, the three-dimensional scanning device acquires point group data generated as three-dimensional coordinates for each point in a longitudinal direction of a road surface, and the profile generation means generates a longitudinal profile of the road surface.

Accordingly with the ground information detection method and the ground information detection system according to the present invention, the longitudinal profile of the road surface is generated based on the three-dimensional point group data that is typically acquired when the road is repaired. Therefore, it does not need to take a lot of time and effort to acquire the longitudinal profile of the road surface, as it is not necessary to conduct the measurement by the surveyor and the measurement by the road surface condition survey vehicle. In particular, the cost may be reduced as the measurement by the road surface condition survey vehicle is not needed. The longitudinal profile obtained according to the present invention is more accurate than the longitudinal profile based on the measurement by the surveyor or the measurement by the road surface condition survey vehicle and is as accurate as the longitudinal profile based on leveling survey.

In the ground information detection method according to the present invention, the examination location designation step designates, as the linear examination location, an outer wheel passing position in a lane of a road or a position away from a center of the lane to a road shoulder side by a predetermined distance.

In the ground information detection system according to the present invention, the examination location designation means designates, as the linear examination location, an outer wheel passing position in a lane of a road or a position away from a center of the lane to a road shoulder side by a predetermined distance.

Accordingly, with the ground information detection method and the ground information detection system according to the present invention, generally, the longitudinal profile used to calculate the international roughness index may be generated.

The ground information detection method according to the present invention includes an image display step for displaying, on a display unit, a three-dimensional image based on the point group data acquired at the point group data acquisition step, and the examination location designation step designates the linear examination location on the three-dimensional image displayed on the display unit.

The ground information detection system according to the present invention includes a display unit that displays a three-dimensional image based on the point group data acquired by the three-dimensional scanning device, and the examination location designation means designates the linear examination location on the three-dimensional image displayed on the display unit.

Accordingly, with the ground information detection method and the ground information detection system according to the present invention, the linear examination location may be easily specified in the three-dimensional image displayed on the display unit.

Advantageous Effect of the Invention

As described above, according to the present invention, it is possible to accurately specify the repair location where a depression is formed on the road surface. Furthermore, it is possible to accurately detect the amount of depression on the road surface and to accurately predict the material cost needed for repair to eliminate the depression of the road surface at the time of start of repair. It is also possible to accurately predict the cutting volume when repair is conducted using the cutting overlay method.

According to the present invention, it does not need to take a lot of time and effort to acquire the profile for the cross-section of the ground, as it is not necessary to conduct the measurement by the surveyor and the measurement by the road surface condition survey vehicle. In particular, the cost may be reduced as the measurement by the road surface condition survey vehicle is not needed. The profile obtained according to the present invention is more accurate than the profile based on the measurement by the surveyor or the measurement by the road surface condition survey vehicle and is as accurate as the profile based on leveling survey.

BRIEF DESCRIPTION OF THE DRAWINGS

FIGS. 16A and 16B are an example of an image in which a color has been added to a predetermined area a.

FIG. 28 is a table illustrating longitudinal profile data.

DESCRIPTION OF THE EMBODIMENT

An embodiment of the present invention is described below with reference to the drawings.

First Embodiment

An elevation difference detection system 1 serving as a ground information detection system according to an embodiment of the present invention includes a 3D scanner 2 (three-dimensional scanning device) and an elevation difference detection device 10 that is wirelessly connected to the 3D scanner 2.

The 3D scanner 2, installed at a known point, emits laser light and thus acquires each point on and around a road surface as point group data (a set of elevations having plane position coordinates) obtained as three-dimensional coordinates and supplies the point group data to the elevation difference detection device 10. The 3D scanner 2 emits line laser light for example in a vertical direction and a horizontal direction to a measurement target (road surface) and measures the time it takes for a laser pulse to travel back and forth between a measurement point on the measurement target and a sensor so as to obtain the distance to the measurement point. The point group data acquired by the 3D scanner 2 is data in positions at intervals of, for example, 25 cm or less, and according to the present embodiment, the 3D scanner 2 acquires the point group data in positions at intervals of, for example, 5 mm. Thus, it is possible to detect elevations of the road surface at small intervals at the time of start of repair, and it is possible to properly detect a depression of the road surface.

In the case described according to the present embodiment, an uneven state of a predetermined area (examination range) on a road surface is examined and, based on the uneven state, the repair location to be repaired is specified.

Figure 1:
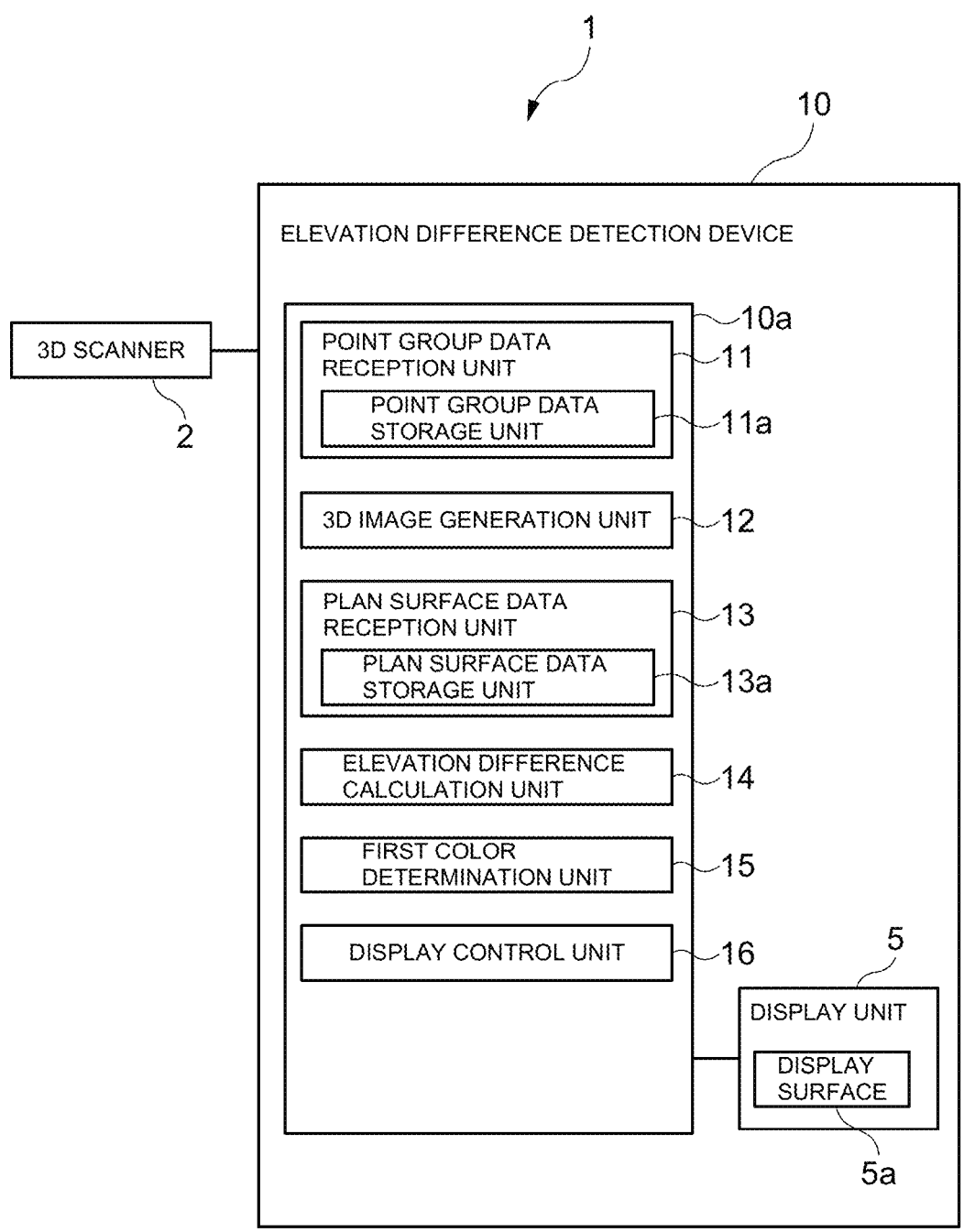
FIG. 1 is a diagram illustrating a schematic configuration of an elevation difference detection system according to a first embodiment of the present invention.

As illustrated in FIG. 1, the elevation difference detection device 10 includes a control unit 10a, and the control unit 10a includes for example a microcomputer, including a CPU, a ROM storing a program for controlling an operation of the elevation difference detection device 10, and a RAM temporarily storing data, and the like, used for executing the above-described program. Specifically, the control unit 10a primarily includes a typical microcomputer including a CPU, a memory, and an interface to perform a predetermined operation and process in accordance with an elevation difference detection program stored in the memory and detect an elevation difference on the road surface based on the point group data acquired from the 3D scanner 2 and plan surface data acquired separately in cooperation with the peripheral hardware.

The control unit 10a of the elevation difference detection device 10 includes a point group data reception unit 11 including a point group data storage unit 11a, a 3D image generation unit 12, a plan surface data reception unit 13 including a plan surface data storage unit 13a, an elevation difference calculation unit 14, a first color determination unit 15, and a display control unit 16. The control unit 10a of the elevation difference detection device 10 includes a display unit 5, such as a display screen.

The point group data reception unit 11 receives the point group data for each point in a predetermined area of the road surface fed from the 3D scanner 2. The point group data storage unit 11a stores the point group data for each point in the predetermined area of the road surface fed from the 3D scanner 2. The point group data includes the data corresponding to a plane position (latitude, longitude) and height at each point on the road surface.

According to the present embodiment, at the time of start of road repair, the 3D scanner 2 acquires the point group data at each point in the predetermined area of the road surface, and the point group data storage unit 11a stores the point group data.

Figure 2:
FIG. 2 illustrates a 3D image based on point group data of a predetermined area of a road at the time of start of repair.

The 3D image generation unit 12 generates a 3D image of the road surface at the time of start of road repair based on the point group data stored in the point group data storage unit 11a. FIG. 2 is a 3D image of a predetermined area of a road surface at the time of start of road repair.

The plan surface data reception unit 13 receives plan surface data indicating a repair plan surface for repairing the predetermined area of the road surface. The plan surface data storage unit 13a stores plan surface data indicating the repair plan surface for repairing the predetermined area of the road surface. The plan surface data indicates the repair plan surface separately acquired by a repair plan to be conducted and is used as reference surface data when the elevation difference at each plane position is calculated. The repair plan is conducted for the entire predetermined area of the road surface, and includes a repair location that needs to be repaired because of a large amount of depression on the road surface and a location that does not need to be repaired because of a small amount of depression on the road surface.

The plan surface data storage unit 13a stores the elevation at each plane position of the predetermined area as the repair plan surface data for repairing the predetermined area of the road surface, and the road is repaired such that the elevation at each plane position of the predetermined area at the time of start of road repair matches the elevation at each plane position planned as the repair plan surface.

The repair plan includes a longitudinal and transverse plan, and after the longitudinal plan along a longitudinal direction of the road is conducted, the transverse plan along a transverse direction at a plurality of locations of the road is conducted so that a repair plan surface for repairing the predetermined area is acquired. Therefore, the repair plan surface includes the plan surface data indicating a longitudinal plan surface and the plan surface data indicating a plurality of transverse plan surfaces.

Figure 3:
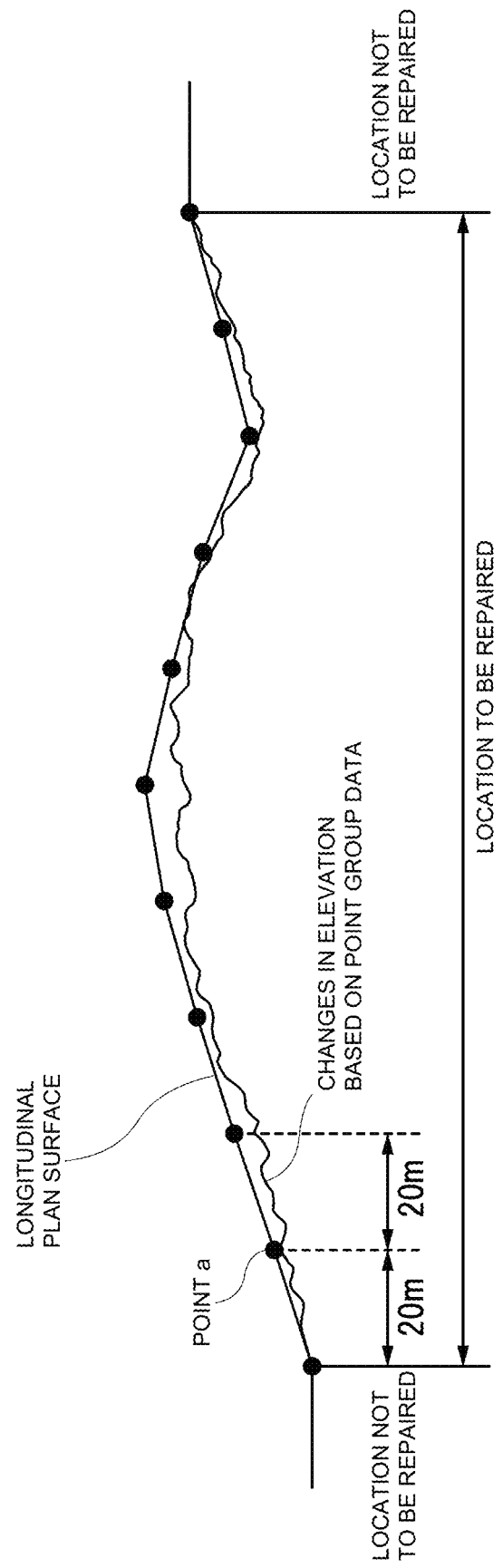
FIG. 3 is a schematic diagram illustrating a longitudinal plan surface.

The longitudinal plan includes a plan for the elevation at each point on a line along the longitudinal direction of the road in a center portion of the road. For example, FIG. 3 illustrates a longitudinal plan surface for the elevation at each point on a line along a center portion of the road. In FIG. 3, a repair location that needs a repair plan is located between a location that is not to be repaired on the left side and a location that is not to be repaired on the right side. Changes in the elevation based on the point group data and also the longitudinal plan surface are illustrated at the repair location in FIG. 3.

The longitudinal plan surface in FIG. 3 is obtained by planning the elevation at each position on the line along the center portion of the road in consideration of the flatness of the road, and the like, and then connecting these elevations. The positions on the line along the center portion of the road are positions at intervals of, for example, 10 m or 20 m.

Figure 4:
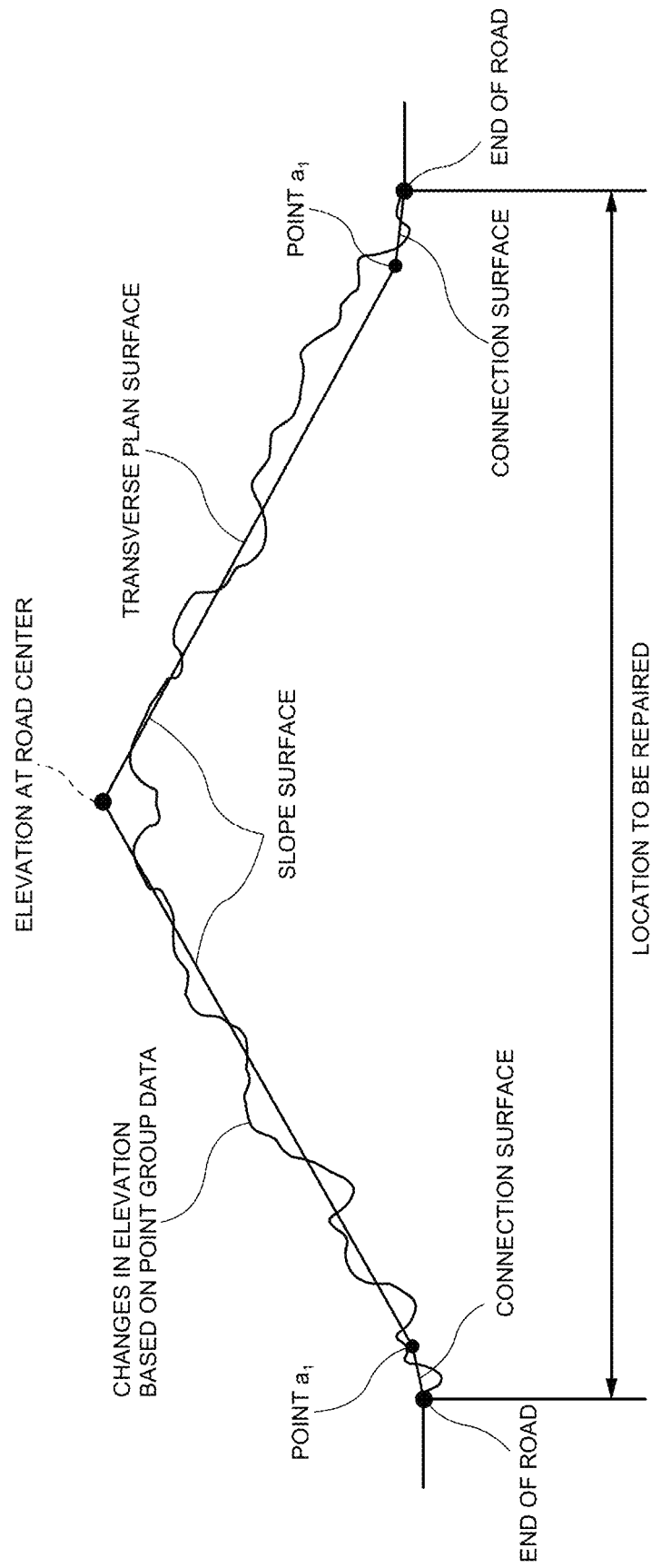
FIG. 4 is a schematic diagram illustrating a transverse plan surface.

After the elevation at each position on the line along the center portion of the road is planned for the longitudinal plan, the transverse plan is conducted. The transverse plan is a plan for the elevation at each point on a line along the transverse direction of the road at each position on the line along the center portion of the road. For example, FIG. 4 illustrates the transverse plan surface for the elevation at each point on the line along the transverse direction of the road at a point a in FIG. 3. In FIG. 4, the repair location that needs a repair plan is located between a left end of the road and a right end of the road. Changes in the elevation based on the point group data and also the transverse plan surface are illustrated at the repair location. The illustration of FIG. 4 is given to easily understand the slope of the road.

The transverse plan surface is obtained by planning for each position on the line along the center portion of the road illustrated in FIG. 3 in consideration of, for example, the slope angle of the slope surface that slopes downward from the elevation at the center of the road toward both ends of the road. For example, the transverse plan of the road is typically designed to have a downward slope at a predetermined slope angle from the center of the road toward an edge of the road. For example, in the transverse plan surface of FIG. 4, the elevation decreases from the elevation at the center of the road at the point a in the longitudinal plan surface of FIG. 3 to a point $a_1$ along a slope surface that slopes downward at a predetermined slope angle toward both ends of the road, and then the elevation decreases to the left end of the road and the right end of the road along a connection surface that connects the point $a_1$ to the left end of the road and the right end of the road. Therefore, the repair based on the transverse plan surface enables a smooth connection between a surface layer portion of the asphalt pavement formed at the repair portion and concrete portions at the left end of the road and the right end of the road. The transverse plan surface in FIG. 4 is an example of the transverse plan surface, and the method for a transverse plan is not limited thereto. Thus, the transverse plan surface may be designed for, for example, the connection of a slope surface that slopes downward at different slope angles from the center of the road toward an end of the road.

Figure 5:
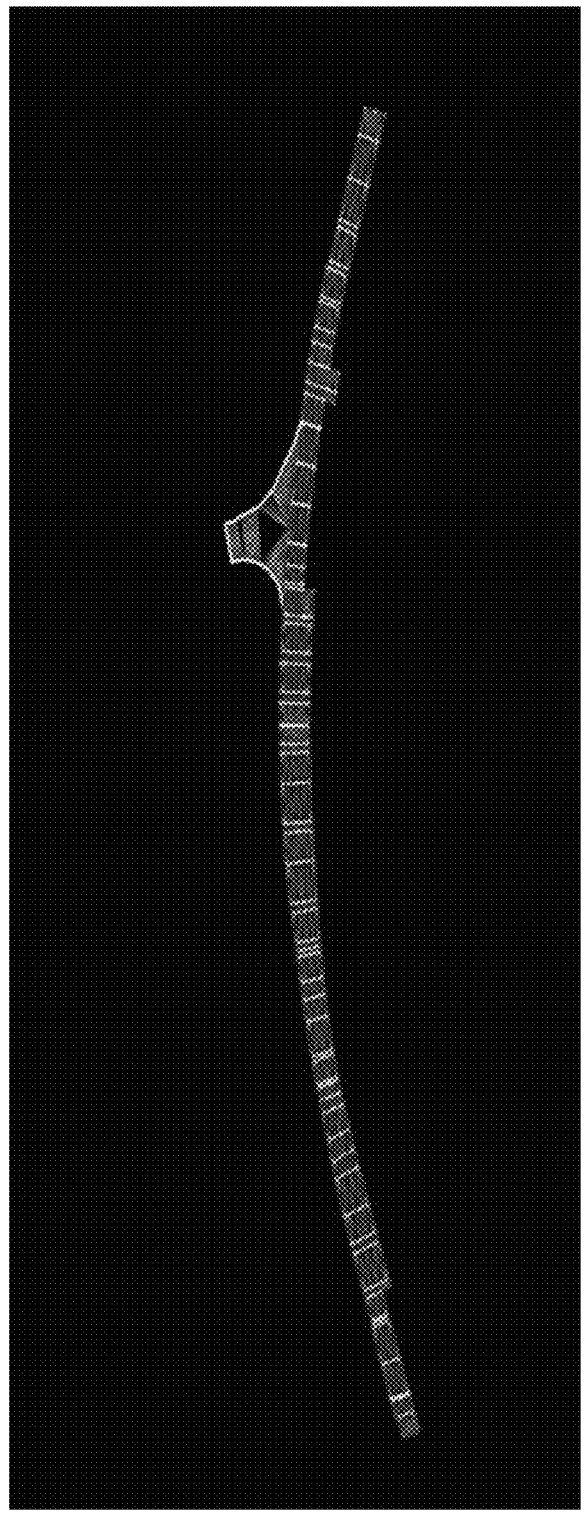
FIG. 5 is a plan view of a repair plan surface indicating a repair plan for repairing the predetermined area of the road.
Figure 6:
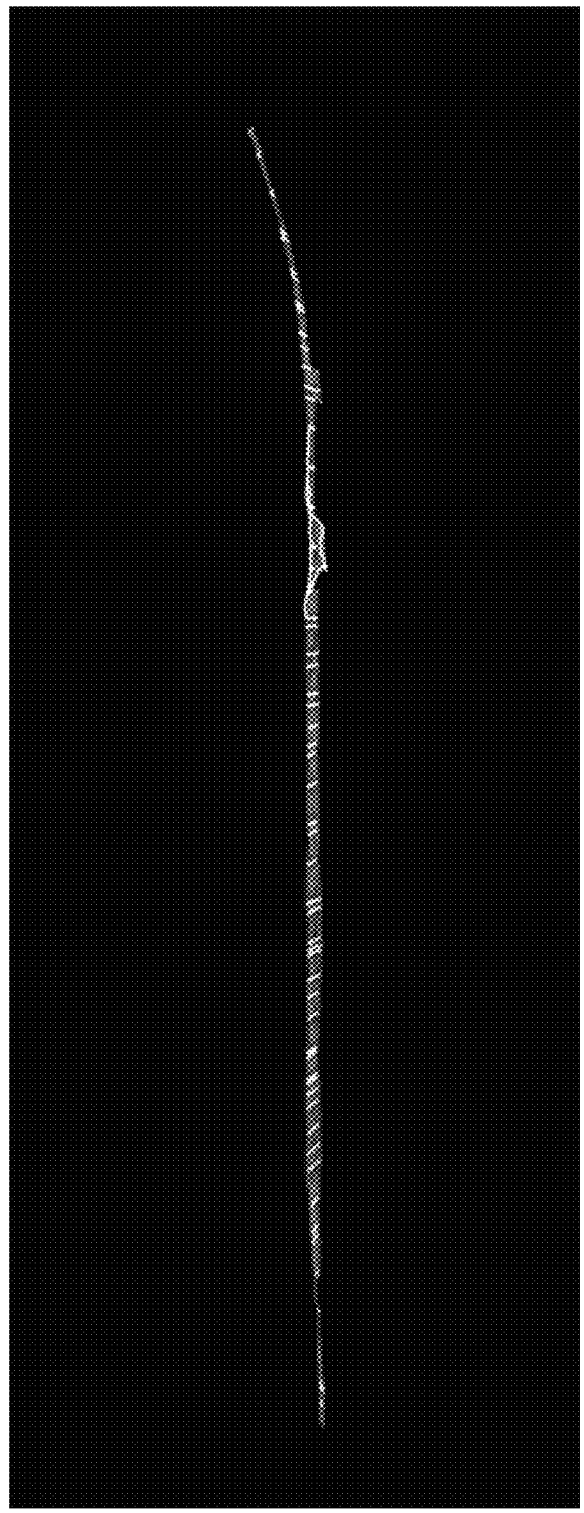
FIG. 6 is a side view of the repair plan surface indicating the repair plan for repairing the predetermined area of the road.

By connecting, in the longitudinal direction, the transverse plan surfaces at the respective positions on the line along the center portion of the road obtained as described above, the repair plan surface for repairing the predetermined area of the road surface is obtained. FIG. 5 is a plan view of the repair plan surface, and FIG. 6 is a side view of the repair plan surface.

The elevation difference calculation unit 14 calculates the elevation difference for each identical plane position in the predetermined area of the road surface based on the point group data stored in the point group data storage unit 11a and the plan surface data stored in the plan surface data storage unit 13a. Therefore, the elevation difference calculation unit 14 calculates, for the predetermined area of the road surface illustrated in FIG. 2, the elevation difference between the elevation at the time of start of road repair and the elevation of the repair plan surface for each identical plane position in the predetermined area of the road. Specifically, based on the point group data stored in the point group data storage unit 11a, the elevation difference calculation unit 14 converts the point group data acquired by the 3D scanner 2 into a three-dimensional triangulated irregular network (TIN) model, which is a collection of triangular planes connected with the point group data as vertices, and derives the data corresponding to the latitude, longitude, and height at each point for each identical plane position in the predetermined area of the road at the time of start of road repair. Thus, the elevation difference calculation unit 14 may derive the data corresponding to the latitude, longitude, and height at each point in the predetermined area of the road even when the point group data of each point in the predetermined area of the road is not stored in the point group data storage unit 11a.

The first color determination unit 15 determines the color corresponding to the magnitude of the elevation difference calculated by the elevation difference calculation unit 14. For example, in accordance with the magnitudes of the elevation difference, different colors are set in association with each other. The colors may be colors that are different from each other or may be colors having different densities.

Figure 7:
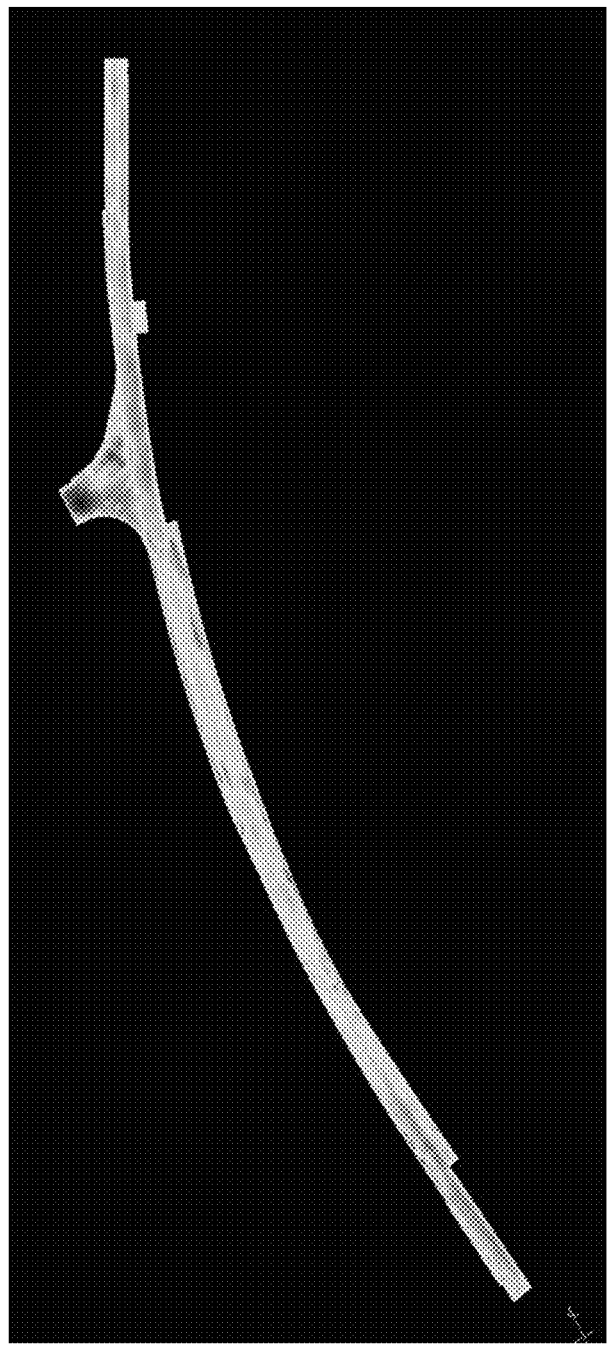
FIG. 7 is a diagram displaying, in color, an elevation difference at each plane position in the predetermined area of the road.
Figure 8:
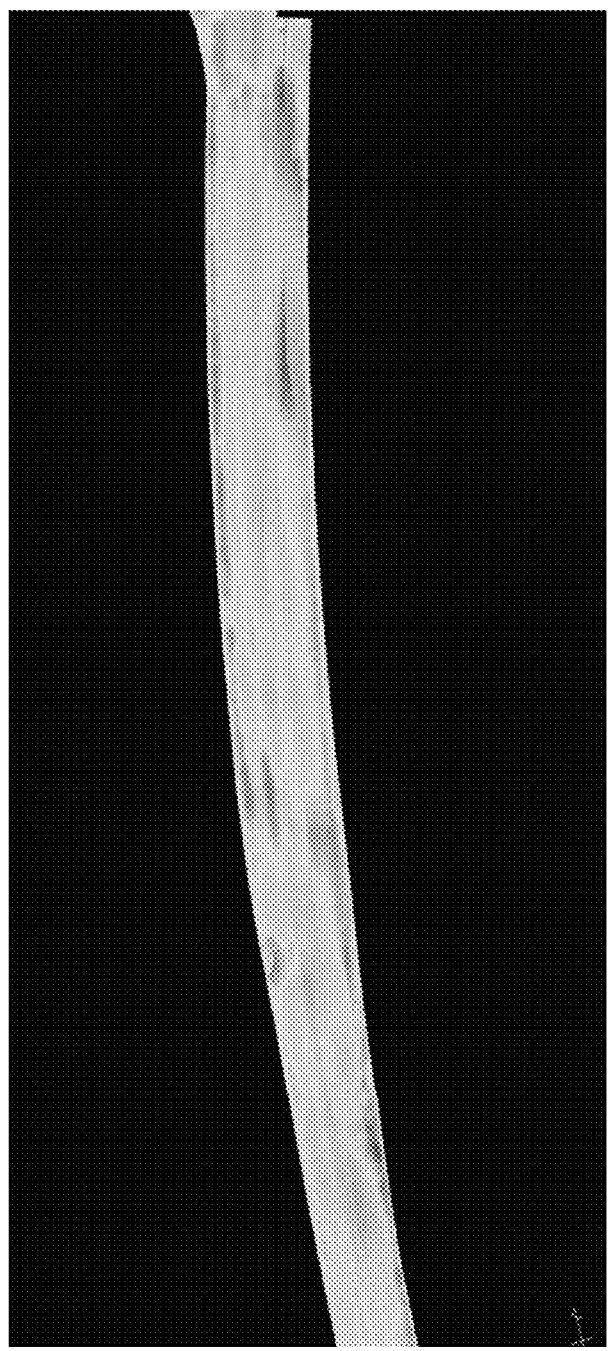
FIG. 8 is an enlarged view of a portion of FIG. 7.

The display control unit 16 controls the content displayed on the display unit 5. The display control unit 16 displays, for example, a 3D image generated by the 3D image generation unit 12 on the display unit 5. The display control unit 16 adds the color determined by the first color determination unit 15 to the 3D image of the predetermined area of the road and displays, on the display unit 5, the elevation difference at each position in the predetermined area of the road surface. Accordingly, as illustrated in FIGS. 7 and 8, the display control unit 16 uses different colors to display the elevation difference between the elevation at the time of start of repair and the elevation of the repair plan surface for each identical plane position in the predetermined area of the road. FIG. 8 is an enlarged view of part of FIG. 7.

For example, when the elevation difference is displayed with a color density between white and black, the portion having a small elevation difference between the elevation at the time of start of repair and the elevation of the repair plan surface is displayed in a color close to white, and the portion having a large elevation difference between the elevation at the time of start of repair and the elevation of the repair plan surface is displayed in a color close to black, as illustrated in FIGS. 7 and 8. Therefore, on the road surface, the portion displayed in a color close to black may be specified as a portion having a large amount of depression on the road surface at the time of start of road repair and as a repair location that needs to be repaired.

Figure 9:
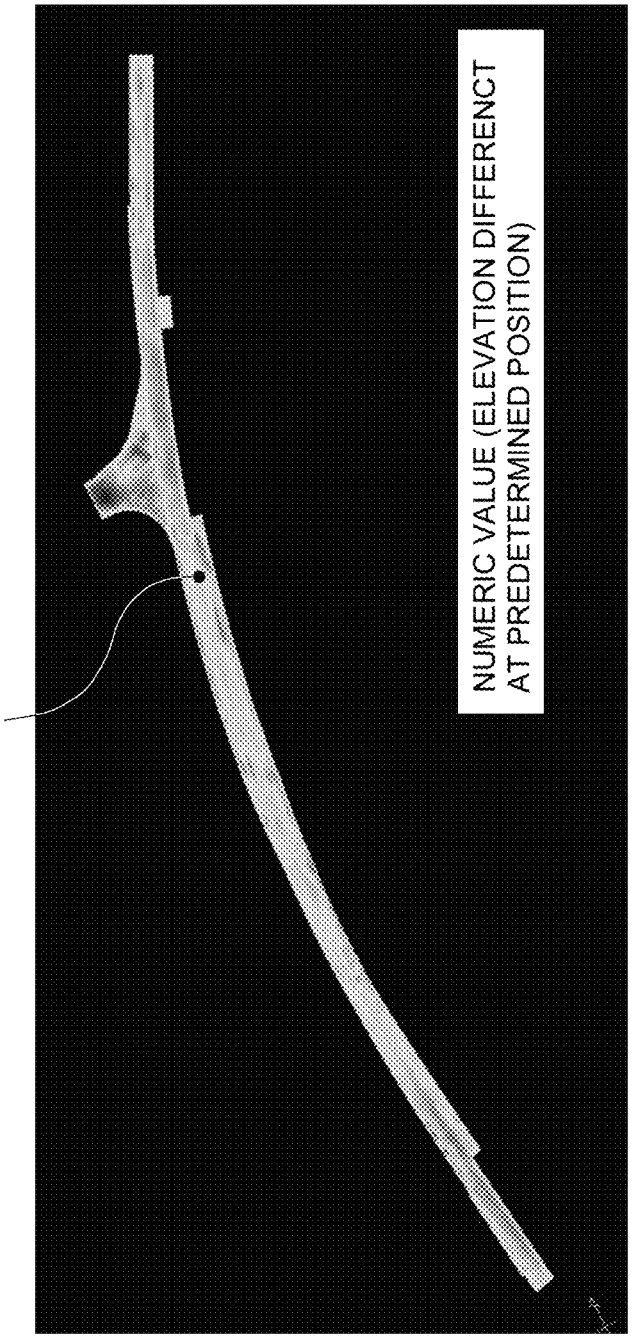
FIG. 9 is a diagram displaying, by a numerical value, the elevation difference at a designated predetermined position.

The user may perform an operation by pressing a display surface 5a of the display unit 5. For example, as illustrated in FIG. 7, in a state where the display unit 5 displays the elevation difference in the predetermined area of the road surface, the user may perform the operation to designate a predetermined position by pressing the predetermined position in the predetermined area displayed on the display surface 5a of the display unit 5. When the operation is performed to designate the predetermined position in the predetermined area, the display control unit 16 displays, on the display unit 5, the numerical value indicating the elevation difference at the designated predetermined position, as illustrated in FIG. 9. According to the present embodiment, the display surface 5a of the display unit 5 is a designation means that designates the predetermined position.

Figure 10:
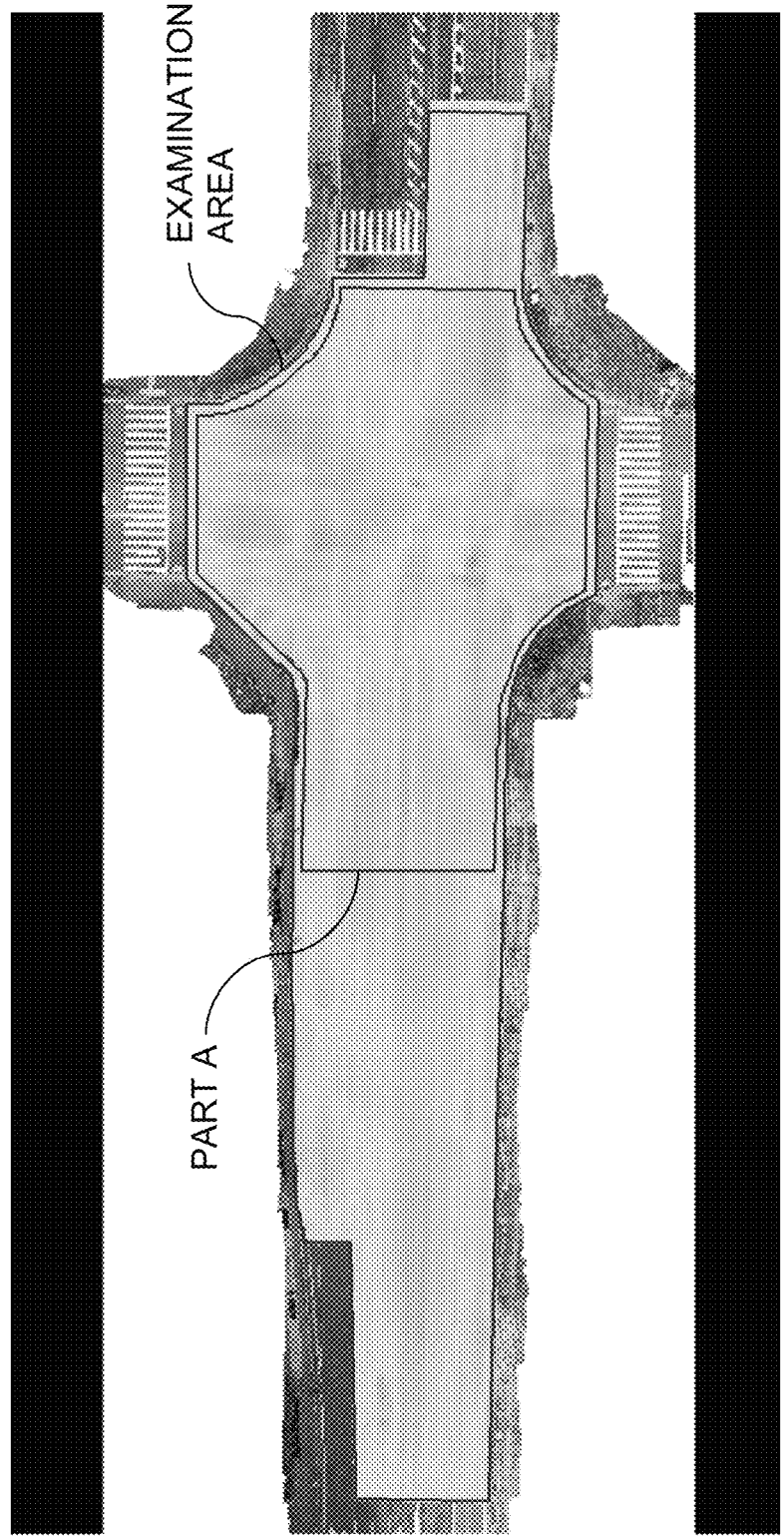
FIG. 10 is a diagram displaying, in color, the elevation difference at each plane position in the predetermined area of the road.
Figure 11:
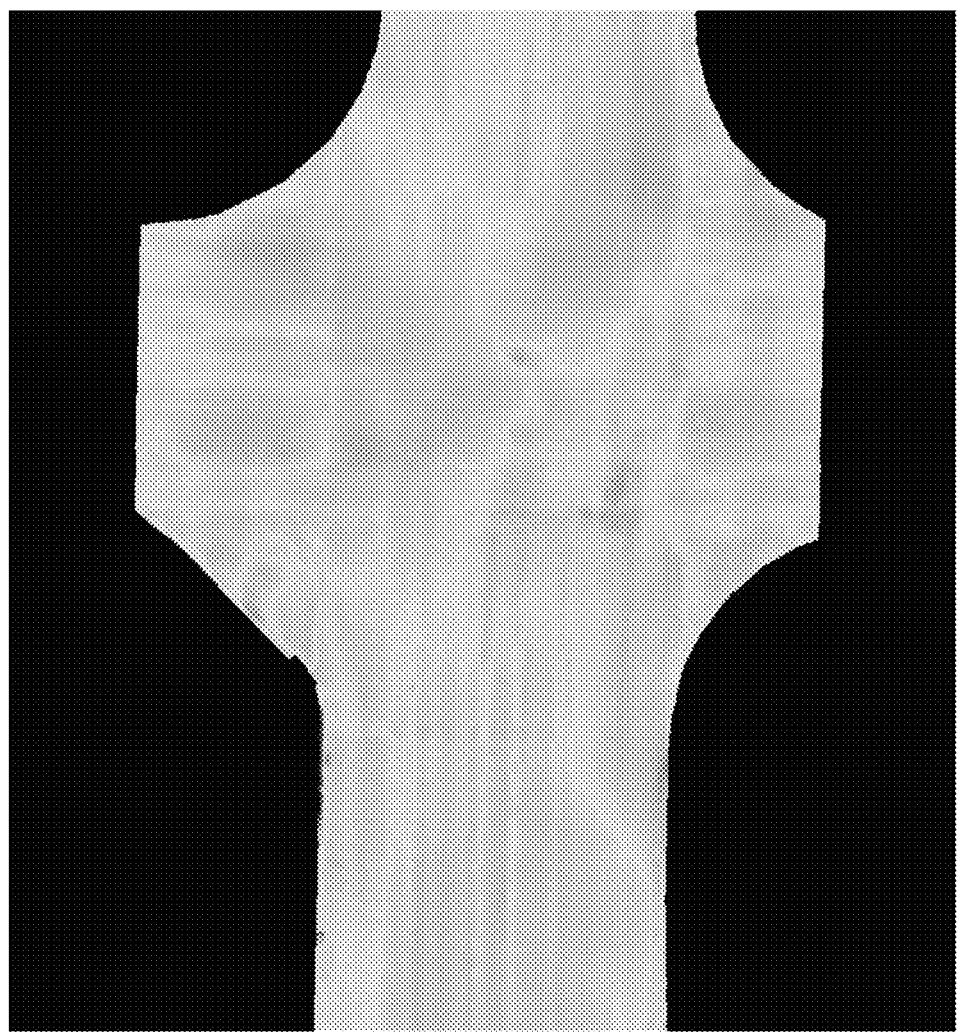
FIG. 11 is an enlarged view of a portion of FIG. 10.

FIG. 10 illustrates the elevation difference between the elevation at the time of start of repair and the elevation of the repair plan surface for each identical plane position in the predetermined area of the road after examining the uneven state of different predetermined areas (examination range) on the road surface in the same manner as described above. FIG. 11 is an enlarged view of a part A in the examination area illustrated in FIG. 10.

As illustrated in FIGS. 10 and 11, the display control unit 16 uses different colors to display the elevation difference between the elevation at the time of start of repair and the elevation of the repair plan surface for each identical plane position in the predetermined area of the road.

Figure 12:
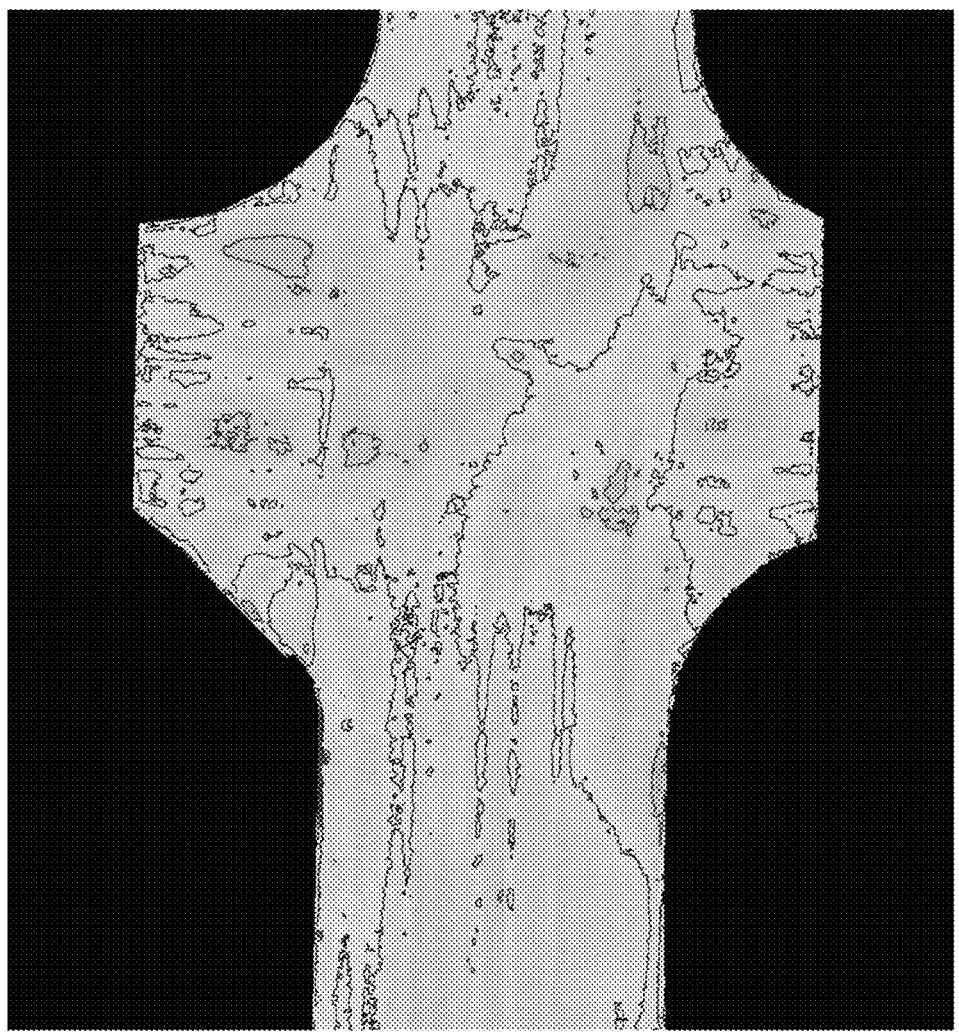
FIG. 12 is a diagram displaying the elevation difference at each plane position in the predetermined area of the road by a line indicating a portion having the identical elevation difference.
Figure 13A:
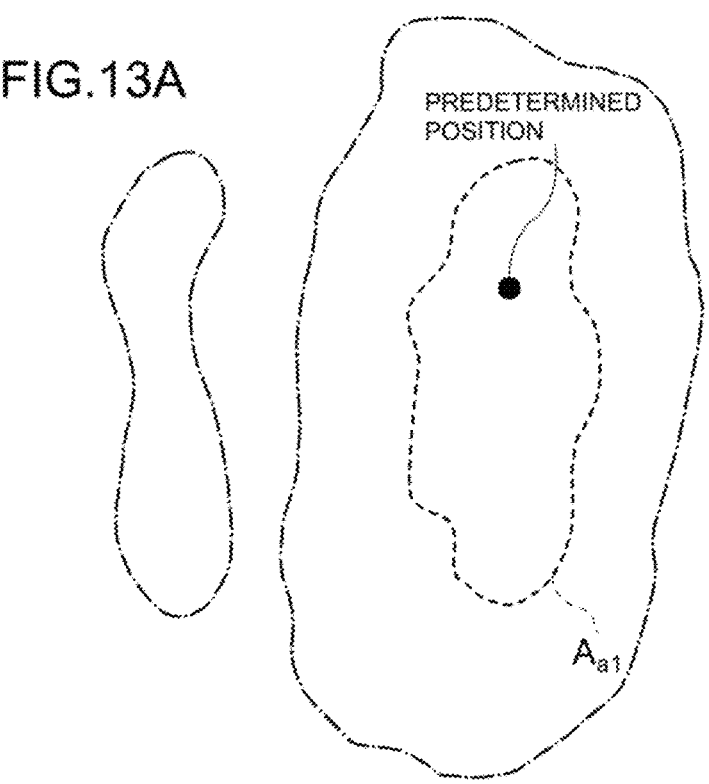
FIGS. 13A and 13B are a diagram displaying, by a numerical value, the size of an area surrounded by a line indicating a portion having the identical elevation difference at the designated predetermined location.
Figure 13B:
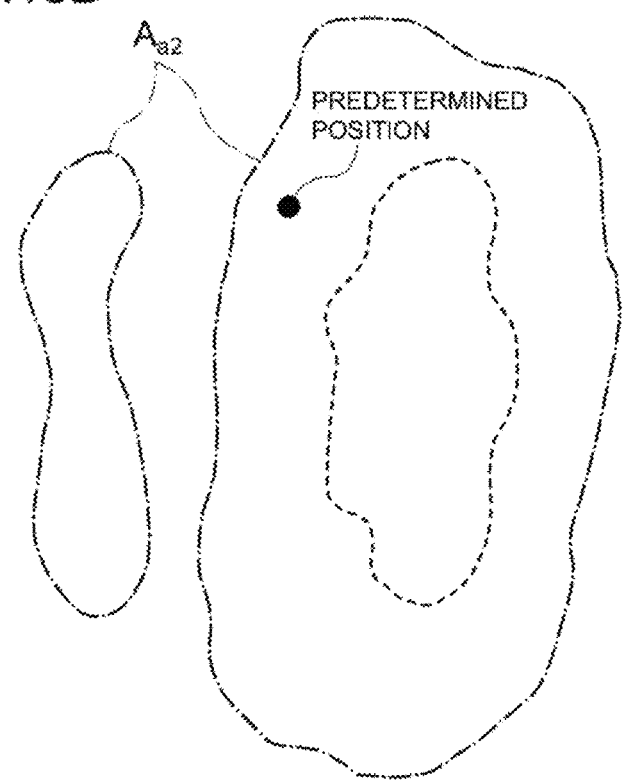

As illustrated in FIG. 12, the display control unit 16 displays the line indicating a portion having the identical elevation difference in the predetermined area of the road. FIG. 12 is a diagram obtained by adding the line indicating the portion having the identical elevation difference to the display of FIG. 11. FIG. 12 illustrates the line indicating the elevation difference corresponding to the color indicating the amount of depression on the road surface and illustrates the line indicating a portion having a plurality of types of elevation differences as the lines indicating the elevation differences, but the elevation difference indicated by the line in the display unit 5 may be set as appropriate. FIGS. 13A and 13B are a schematic diagram of a line indicating an elevation difference displayed on the display unit 5 and, for example, as illustrated in FIGS. 13A and 13B, when an operation is performed to designate a predetermined position in the predetermined area, the display control unit 16 displays, on the display unit 5, the numerical value indicating the size of the area surrounded by the line indicating the portion having the identical elevation difference near the designated predetermined position. In FIG. 13A, when an operation is performed to designate the predetermined position in the predetermined area, the display unit 5 displays the numerical value indicating the size of one area surrounded by a line $A_{a1}$, and in FIG. 13B, when an operation is performed to designate the predetermined position in the predetermined area, the display unit 5 displays the numerical value indicating the sum of sizes of two areas surrounded by a line A. In FIG. 13B, when an operation is performed to designate the predetermined position in the predetermined area, the display unit 5 may display the numerical value: indicating the size of one area that is included in the two areas surrounded by the line $A_{a2}$ and that includes the predetermined position.

Figure 14:
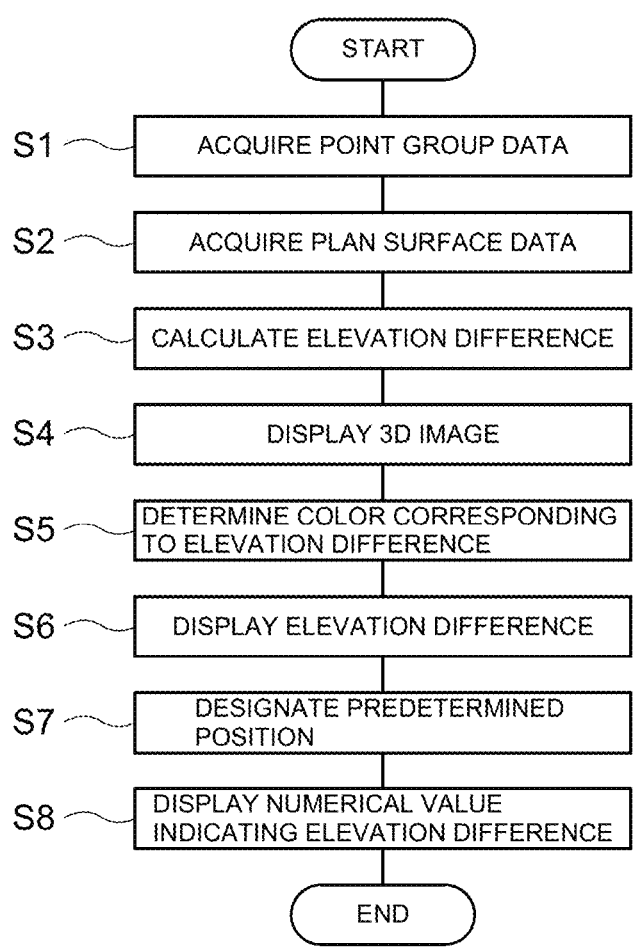
FIG. 14 is a flowchart illustrating an elevation difference detection method of the elevation difference detection system of FIG. 1.

An elevation difference detection method (ground information detection method) of the elevation difference detection system 1 according to the present embodiment is described with reference to FIG. 14.

At Step S1 (point group data acquisition step), the 3D scanner 2, installed around the road, scans a predetermined area of the road surface to acquire point group data at the time of start of road repair. Then, in the elevation difference detection device 10, the point group data reception unit 11 receives the point group data fed from the 3D scanner 2, and the point group data storage unit 11a stores the point group data fed from the 3D scanner 2 to the elevation difference detection device 10.

At Step S2 (reference surface data acquisition step), the longitudinal and transverse plan is conducted to acquire the plan surface data indicating the repair plan surface for repairing the predetermined area of the road. Then, in the elevation difference detection device 10, the plan surface data reception unit 13 receives the fed plan surface data, and the plan surface data storage unit 13a stores the plan surface data.

At Step S3 (elevation difference calculation step), an elevation difference is calculated for each identical plane position in the predetermined area of the road surface based on the point group data acquired at Step S1 and the plan surface data acquired at Step S2.

At Step S4 (image display step), the display unit 5 displays a 3D image of the predetermined area of the road surface at the time of start of repair based on the point group data acquired at Step S1.

At Step S5 (first color determination step), the first color determination unit 15 determines the color corresponding to the magnitude of the elevation difference for each identical plane position in the predetermined area calculated at Step S3.

At Step S6 (first elevation difference color display step, elevation difference line display step), the display unit 5 uses multiple colors to display the elevation difference in the predetermined area by adding the color determined at Step S5 to the 3D image of the predetermined area of the road surface displayed on the display unit 5, and also the display unit 5 displays the line indicating the identical elevation difference on the 3D image of the predetermined area of the road surface displayed on the display unit 5.

When the predetermined position is designated in the predetermined area at Step S7 (designation step), the display unit 5 displays the numerical value indicating the elevation difference at the designated predetermined position and the numerical value indicating the size of the area surrounded by the line indicating the portion having the identical elevation difference near the designated predetermined position at Step S8 (numerical value display step).

The elevation difference detection method according to the present embodiment includes: the point group data acquisition step for acquiring the point group data generated as three-dimensional coordinates for each point in the predetermined area of the road surface at the time of start of repair with the laser light emitted from the 3D scanner 2 installed at a known point; the plan surface data acquisition step for acquiring the plan surface data indicating the repair plan surface for repairing the predetermined area; and the elevation difference calculation step for calculating the elevation difference for each identical plane position in the predetermined area based on the point group data acquired at the point group data acquisition step and the plan surface data acquired at the plan surface data acquisition step.

The elevation difference detection system 1 according to the present embodiment includes: the point group data storage unit 11a that stores the point group data generated as three-dimensional coordinates for each point in the predetermined area of the road surface at the time of start of repair, acquired with the laser light emitted from the 3D scanner 2 installed at a known point; the plan surface data storage unit 13a that stores the plan surface data indicating the repair plan surface for repairing the predetermined area; and the elevation difference calculation unit 14 that calculates the elevation difference for each identical plane position in the predetermined area based on the point group data stored in the point group data storage unit 11a and the plan surface data stored in the plan surface data storage unit 13a.

The elevation difference detection program according to the present embodiment, when loaded into a computer, causes the computer to function as: the point group data reception unit 11 that receives the point group data generated as three-dimensional coordinates for each point in the predetermined area of the road surface at the time of start of repair, acquired with the laser light emitted from the 3D scanner 2 installed at a known point; the plan surface data reception unit 13 that receives the plan surface data indicating the repair plan surface for repairing the predetermined area; and the elevation difference calculation unit 14 that calculates the elevation difference for each identical plane position in the predetermined area based on the point group data received by the point group data reception unit 11 and the plan surface data received by the plan surface data reception unit 13.

Accordingly, with the elevation difference detection method, the elevation difference detection system 1, and the elevation difference detection program according to the present embodiment, when the predetermined area of the road surface is repaired, the elevation difference at each plane position in the predetermined area is calculated based on the point group data for each point of the road surface at the time of start of repair and the plan surface data indicating the repair plan surface so that it is possible to accurately specify the repair location where a depression is formed on the road surface. The amount of depression of the road surface may be accurately detected, and the material cost needed for repair to eliminate the depression on the road surface may be accurately predicted based on the amount of depression on the road surface at the time of start of repair. It is also possible to accurately predict the cutting volume when repair is conducted using the cutting overlay method.

The elevation difference detection method according to the present embodiment includes: the image display step for displaying, on the display unit, the three-dimensional image based on the point group data acquired at the point group data acquisition step; the first color determination step for determining the color corresponding to the magnitude of the elevation difference calculated at the elevation difference calculation step for each identical plane position in the predetermined area; and the elevation difference color display step for adding the color determined at the first color determination step to the three-dimensional image displayed at the image display step to display the elevation difference in the predetermined area.

The elevation difference detection system 1 according to the present embodiment includes: the display control unit 16 that displays, on the display unit 5, the three-dimensional image based on the point group data stored in the point group data storage unit 11a; and the first color determination unit 15 that determines the color corresponding to the magnitude of the elevation difference calculated by the elevation difference calculation unit 14 for each identical plane position in the predetermined area, and the display control unit 16 adds the color determined by the first color determination unit 15 to the three-dimensional image displayed by the display unit 5 to display the elevation difference in the predetermined area.

Thus, with the elevation difference detection method and the elevation difference detection system 1 according to the present embodiment, the elevation difference at each plane position in the predetermined area is displayed in the color corresponding to the magnitude thereof so that the location where a depression is formed on the road surface and the amount of depression on the road surface may be easily determined.

The elevation difference detection method according to the present embodiment includes the image display step for displaying, on the display unit, the three-dimensional image based on the point group data acquired at the point group data acquisition step; and the elevation difference line display step for displaying, on the three-dimensional image displayed at the image display step, the line indicating the portion having the identical elevation difference in the predetermined area in accordance with the magnitude of the elevation difference calculated at the elevation difference calculation step.

The elevation difference detection system according to the present embodiment includes the display control unit 16 that displays, on the display unit, the three-dimensional image based on the point group data stored in the point group data storage unit 11a, and the display control unit 16 displays, on the three-dimensional image displayed on the display unit, the line indicating the portion having the identical elevation difference in the predetermined area in accordance with the magnitude of the elevation difference calculated by the elevation difference calculation unit 14.

Thus, with the elevation difference detection method and the elevation difference detection system according to the present embodiment, the area having the identical elevation difference in the predetermined area is displayed by a line so that the location where a depression is formed on the road surface and the amount of depression on the road surface may be easily determined.

The elevation difference detection method according to the present embodiment includes: the designation step for designating the predetermined position in the predetermined area while the display unit 5 displays the elevation difference in the predetermined area at the first elevation difference display step; and the numerical value display step for displaying, on the display unit, the numerical value indicating the elevation difference in the predetermined position when the predetermined position has been designated at the designation step.

The elevation difference detection method according to the present embodiment includes: the designation step for designating the predetermined position in the predetermined area while the display unit 5 displays the elevation difference in the predetermined area at the first elevation difference line display step; and the numerical value display step for displaying, on the display unit 5, the numerical value indicating the size of the area surrounded by the line indicating the portion having the identical elevation difference near the predetermined position when the predetermined position has been designated at the designation step.

The elevation difference detection system 1 according to the present embodiment includes the display surface 5a of the display unit 5 to designate the predetermined position in the predetermined area while the display unit 5 displays the elevation difference in the predetermined area, and the display control unit 16 displays, on the display unit 5, the numerical value indicating the elevation difference at the predetermined position when the predetermined position has been designated on the display surface 5a of the display unit 5.

The elevation difference detection system 1 according to the present embodiment includes the display surface 5a of the display unit 5 to designate the predetermined position in the predetermined area while the display unit 5 displays the elevation difference in the predetermined area and, when the predetermined position has been designated on the display surface 5a of the display unit 5, the display control unit 16 displays, on the display unit 5, the numerical value indicating the size of the area surrounded by the line indicating the portion having the identical elevation difference near the predetermined position.

Accordingly, with the elevation difference detection method and the elevation difference detection system 1 according to the present embodiment, it is possible to numerically detect the elevation difference at the predetermined position in the predetermined area and the size of the area surrounded by the line indicating the portion having the identical elevation difference near the predetermined position.

Second Embodiment

An elevation difference detection system 101 according to a second embodiment is different from the elevation difference detection system 1 according to the first embodiment in that, while an inspector determines the state of the road surface based on the image having a plurality of colors added thereto in accordance with the magnitude of the elevation difference according to the first embodiment, the elevation difference detection system 101 automatically determines the state of the road surface according to the second embodiment. As for the elevation difference detection system 101 according to the second embodiment, detailed descriptions are omitted for the same configuration as that of the elevation difference detection system 1 according to the first embodiment.

Figure 15:
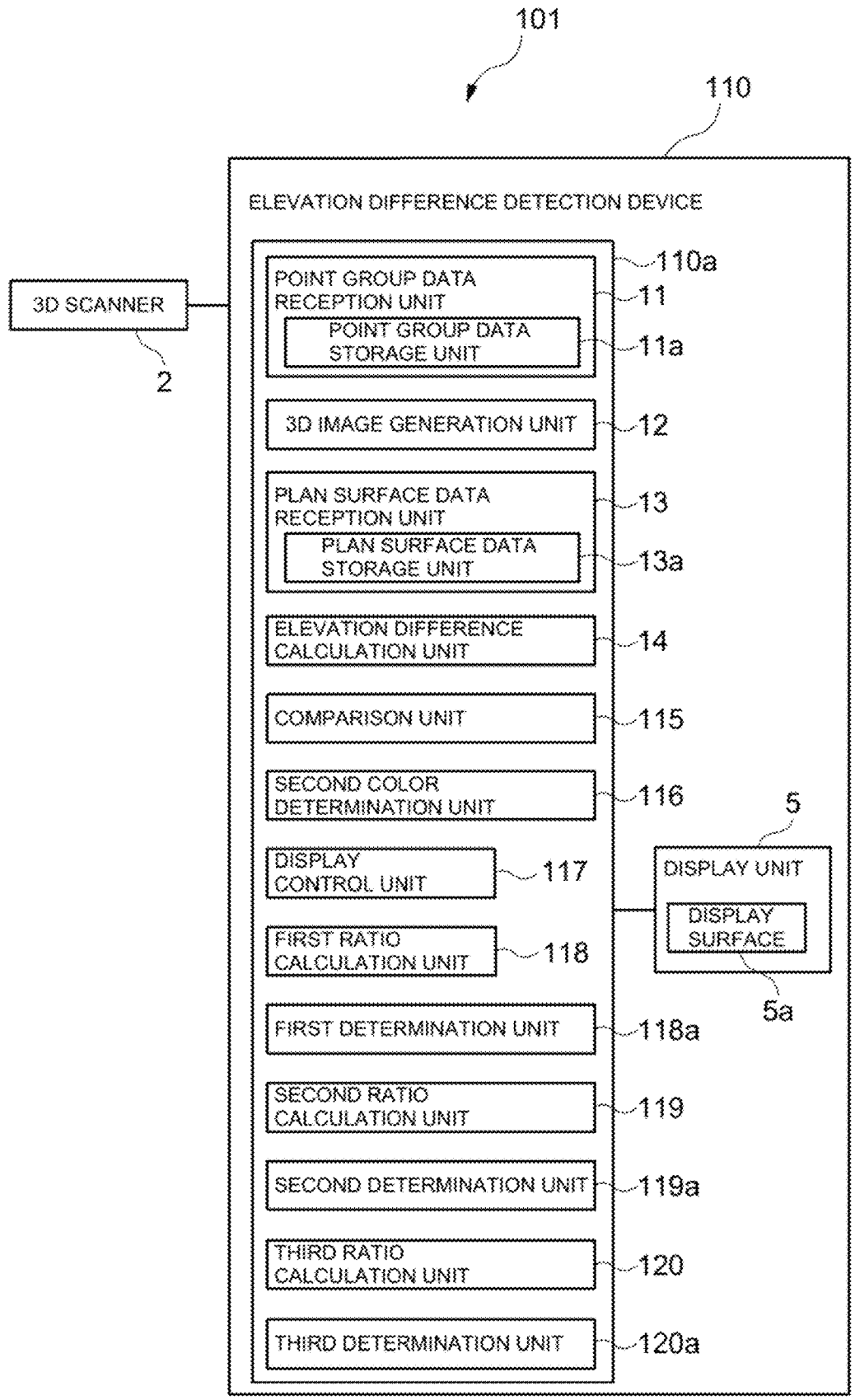
FIG. 15 is a diagram illustrating a schematic configuration of an elevation difference detection system according to a second embodiment of the present invention.

As illustrated in FIG. 15, the elevation difference detection system 101 according to the present embodiment includes the 3D scanner 2 (three-dimensional scanning device) and an elevation difference detection device 110 that is wirelessly connected to the 3D scanner 2.

The elevation difference detection device 110 includes a control unit 110a, and the control unit 110a includes the point group data reception unit 11 including the point group data storage unit 11a, the 3D image generation unit 12, the plan surface data reception unit 13 including the plan surface data storage unit 13a, the elevation difference calculation unit 14, a comparison unit 115, a second color determination unit 116, a display control unit 117, a first ratio calculation unit 118, a first determination unit 118a, a second ratio calculation unit 119, a second determination unit 119a, a third ratio calculation unit 120, and a third determination unit 120a.

The point group data reception unit 11, the 3D image generation unit 12, the plan surface data reception unit 13, and the elevation difference calculation unit 14 are the same as those in the first embodiment.

The comparison unit 115 compares the magnitude of the elevation difference with a predetermined value for each identical plane position in the predetermined area. According to the present embodiment, the comparison unit 115 divides the predetermined area into square areas (hereinafter sometimes referred to as detection areas) of 0.25 meters× 0.25 meters and compares the magnitude of the elevation difference with the predetermined value for each detection area. Specifically, the predetermined area is divided into a plurality of detection areas, the detection area is assumed to be one plane position, and the magnitude of the elevation difference is compared with the predetermined value for each detection area. According to the present embodiment, the elevation difference of each detection area is the average value of the elevation differences of a plurality of sets of point group data within the detection area, using the elevation difference of each set of point group data in positions at intervals of 5 mm, for example.

Specifically, the comparison unit 115 compares the magnitude of the elevation difference with 0, which is the predetermined value, for each identical detection area in the predetermined area. In the description according to the present embodiment, 0, which is the predetermined value, is compared with the magnitude of the elevation difference by the comparison unit 115. Specifically, the magnitude of the elevation difference is the value obtained by subtracting the elevation of the repair plan surface from the elevation at the time of start of repair, the magnitude of the elevation difference is 0, which is the predetermined value, when the elevation at the time of start of repair is identical to the elevation of the repair plan surface, the magnitude of the elevation difference is a positive value when the elevation at the time of start of repair is higher than the elevation of the repair plan surface, and the magnitude of the elevation difference is a negative value when the elevation at the time of start of repair is lower than the elevation of the repair plan surface.

Therefore, the comparison unit 115 determines whether the difference between the elevation at the time of start of repair and the elevation of the repair plan surface is more than 0 (whether it is a protruded area where the elevation at the time of start of repair is higher than the elevation of the repair plan surface) or whether the difference between the elevation at the time of start of repair and the elevation of the repair plan surface is 0 or less (whether it is a recessed area where the elevation at the time of start of repair is equal to or less than the elevation of the repair plan surface).

The second color determination unit 116 determines, for each detection area, the color corresponding to either the detection area having the magnitude of the elevation difference of more than 0 or the detection area having the magnitude of the elevation difference of 0 or less. Specifically, the second color determination unit 116 determines that the color of the detection area is a cold color when the magnitude of the elevation difference is more than 0, and determines that the color of the detection area is a warm color when the magnitude of the elevation difference is 0 or less.

More specifically, with regard to the detection area having the magnitude of the elevation difference of more than 0, the second color determination unit 116 determines that the color of the detection area is a dark cold color when the magnitude of the elevation difference is more than $a_1$ (here, $a_1$ is a number larger than 0) and determines that the color of the detection area is a light cold color when the magnitude of the elevation difference is more than 0 and $a_1$ or less. That is, the second color determination unit 116 determines that the color of the detection area is a darker cold color as the elevation difference is greater. According to the present embodiment, $a_1$ is for example 50 mm.

Furthermore, with regard to the detection area having the magnitude of the elevation difference of 0 or less, the second color determination unit 116 determines that the color of the detection area is a dark warm color when the magnitude of the elevation difference is less than $a_2$ (here, $a_2$ is a number smaller than 0) and determines that the color of the detection area is a light warm color when the magnitude of the elevation difference is less than 0 and more than $a_2$. That is, the second color determination unit 116 determines that the color of the detection area is a darker warm color as the elevation difference is greater. According to the present embodiment, $a_2$ is for example 50 mm.

The display control unit 117 controls the content displayed on the display unit 5. The display control unit 117 displays, for example, a 3D image generated by the 3D image generation unit 12 on the display unit 5. The display control unit 117 adds the color determined by the second color determination unit 116 to the 3D image of the predetermined area of the road and displays, on the display unit 5, the elevation difference in each detection area in the predetermined area of the road surface. Thus, the display control unit 117 uses different colors to display the magnitude of the difference between the elevation at the time of start of repair and the elevation of the repair plan surface for each identical detection area in the predetermined area of the road.

Figure 16A:
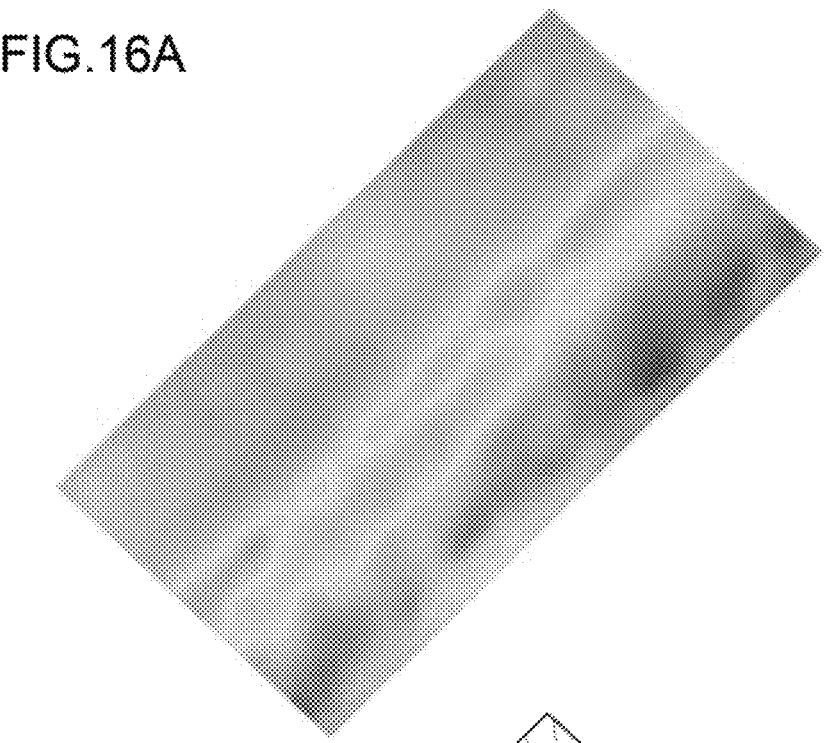
Figure 16B:
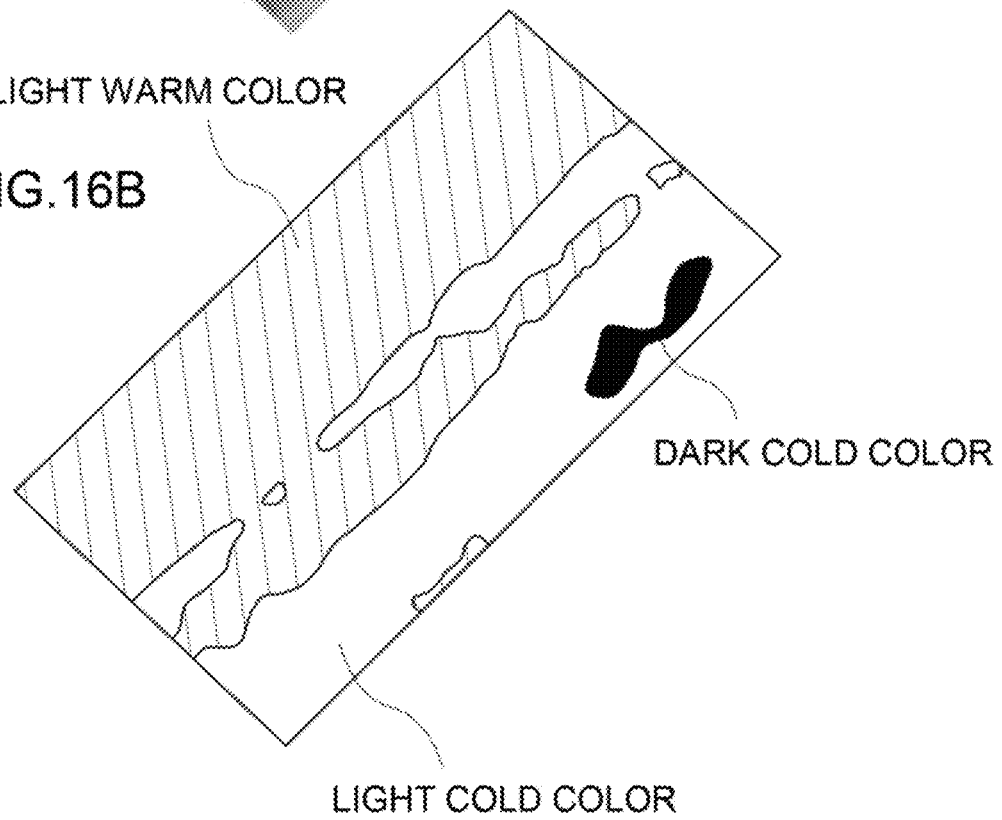
Figure 17A:
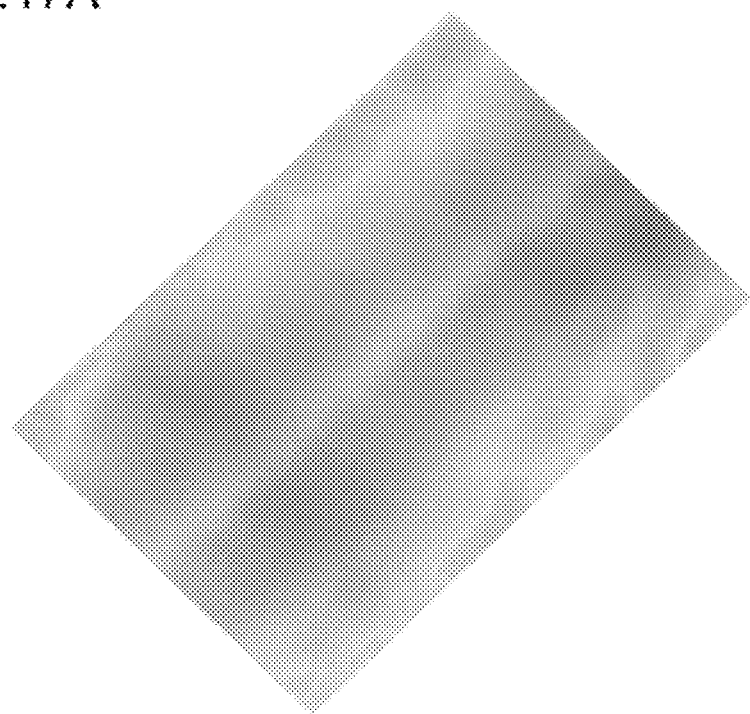
FIGS. 17A and 17B are an example of an linage in which a color has been added to a predetermined area b.
Figure 17B:
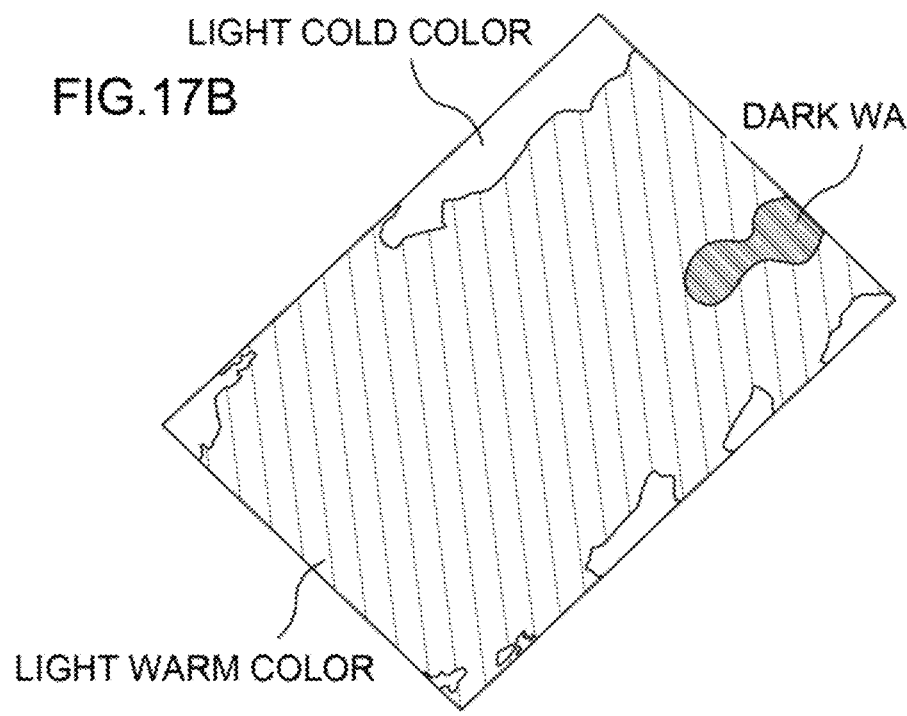
Figure 18A:
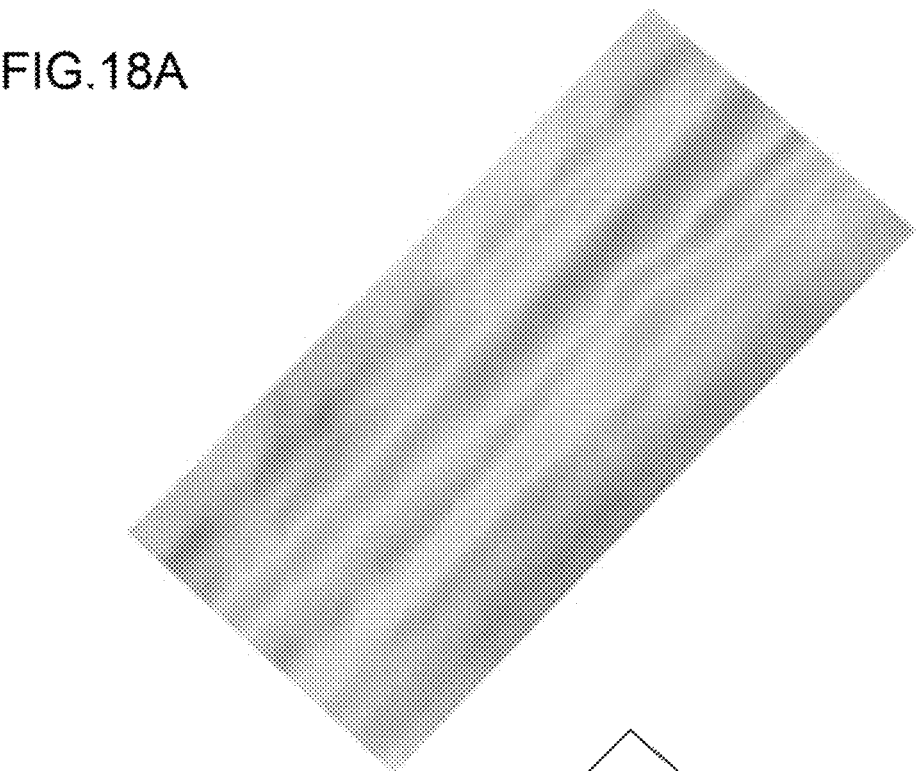
FIGS. 18A and 18B are an example of an image in which a color has been added to a predetermined area c.
Figure 18B:
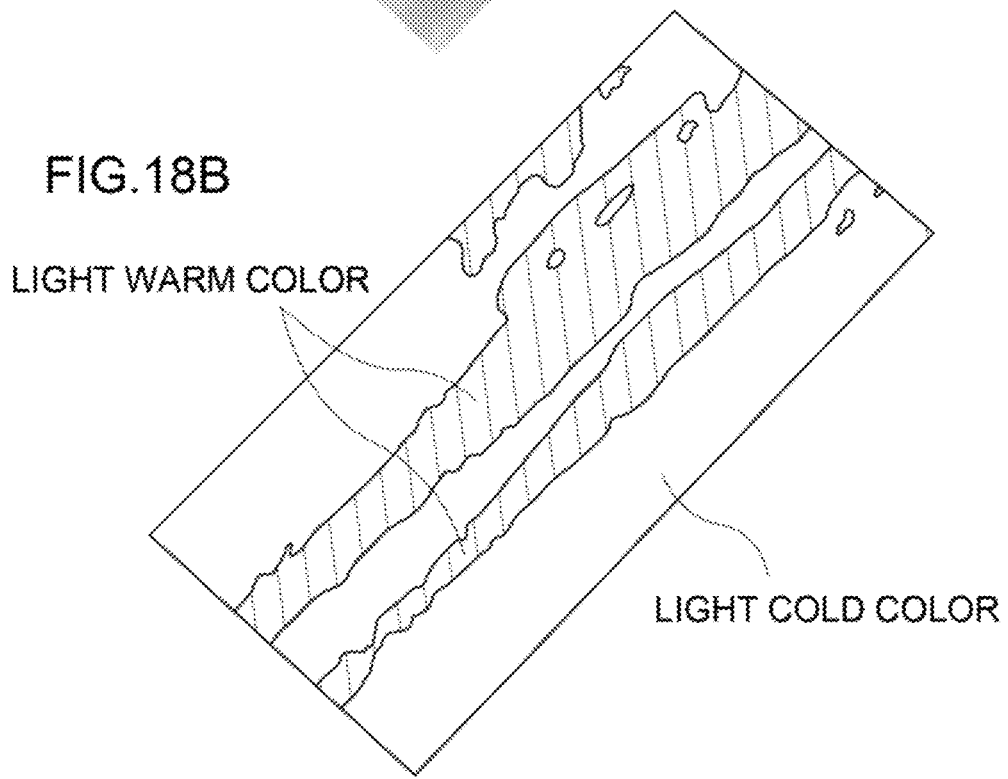

FIG. 16A to FIG. 18B are examples of images obtained by dividing the road surface into predetermined areas having a length of, for example, 10 meters and adding the colors determined by the second color determination unit 116 to the predetermined areas. FIGS. 16A and 16B illustrate the state of a predetermined areas. FIGS. 17A and 17B illustrate the state of a predetermined area b, and FIGS. 18A and 18B illustrate the state of a predetermined area c. FIGS. 16A to 18A illustrate color images to which the colors determined by the second color determination unit 116 have been added, and FIGS. 16B to 18B are schematic diagrams illustrating the color arrangement of FIGS. 16A to 18A.

As described above, in each predetermined area, the detection area where the elevation at the time of start of repair is lower than the elevation of the repair plan surface is displayed in a warm color (dark warm color or light warm color) as a recessed area, and the detection area where the elevation at the time of start of repair is higher than the elevation of the repair plan surface is displayed in a cold color (dark cold color or light cold color) as a protruded area.

In the predetermined area a, as illustrated in FIGS. 16A and 16B, a large portion of the left area is displayed in a dark warm color, a large portion of the right area is displayed in a light cold color, and an area inside the light cold area is displayed in a dark cold color. Therefore, it is understood that the large portion of the left area of the predetermined area a is a recessed portion with respect to the repair plan surface, and the large portion of the right area is a protruded portion with respect to the repair plan surface.

As illustrated in FIGS. 17A and 17B, a large portion of the predetermined area b is displayed in a light warm color, an area inside the light warm color area is displayed in a dark warm color, and partial areas at both right and left ends are displayed in a light cold color. Therefore, it may be understood that the large portion of the predetermined area b is a recessed portion with respect to the repair plan surface and the partial areas at both right and left ends are protruded portions with respect to the repair plan surface.

As illustrated in FIGS. 18A and 18B, a large portion of the predetermined area c is displayed in a light cold color, and the portions with which the wheels of a vehicle are in contact are displayed in a light warm color. Therefore, it may be understood that the large portion of the predetermined area c is a protruded portion with respect to the repair plan surface and the portions with which the wheels of a vehicle are in contact are recessed portions with respect to the repair plan surface.

It is understood from FIG. 16A to FIG. 18B that the uneven states of the predetermined area a, the predetermined area b, and the predetermined area c are different from each other based on the hue of the predetermined area.

The first ratio calculation unit 118 calculates, based on a comparison result by the comparison unit 115, the ratio of the detection areas having the magnitude of the elevation difference of more than 0 and the ratio of the detection areas having the magnitude of the elevation difference of 0 or less. Specifically, the first ratio calculation unit 118 calculates the ratio of the recessed areas (areas in a warm color) with respect to the repair plan surface to the protruded areas (areas in a cold color) with respect to the repair plan surface. According to the present embodiment, a color is added for each detection area, and therefore when the entire predetermined area is divided into a plurality of detection areas, the first ratio calculation unit 118 calculates the ratio of the number (size) of detection areas in a warm color to the number of detection areas in the entire predetermined area and the ratio of the number (size) of detection areas in a cold color to the number of detection areas in the entire predetermined area.

Based on the comparison result by the comparison unit 115, the second ratio calculation unit 119 calculates the total ratio of the detection areas that have the magnitude of the elevation difference of more than 0 and have the magnitude of the elevation difference of more than $a_1$ (here, $a_1$ is a number larger than 0) and the detection areas that have the magnitude of the elevation difference of 0 or less and have the magnitude of the elevation difference of $a_2$ or less (here, $a_2$ is a number smaller than 0). That is, the second ratio calculation unit 119 calculates the total ratio of, with respect to the entire predetermined area, the recessed areas (areas in a dark warm color) having a large elevation difference with respect to the repair plan surface and the protruded areas (areas in a dark cold color) having a large elevation difference with respect to the repair plan surface. According to the present embodiment, the ratio of the detection areas that have the magnitude of the elevation difference of more than 0 and have the magnitude of the elevation difference of more than $a_1$ (here, $a_1$ is a number larger than 0) is used as the ratio of the detection areas in a first predetermined range, and the ratio of the detection areas that have the magnitude of the elevation difference of 0 or less and have the magnitude of the elevation difference of $a_2$ or less (here, $a_2$ is a number smaller than 0) is used as the ratio of the detection areas in a second predetermined range.

Figure 19:
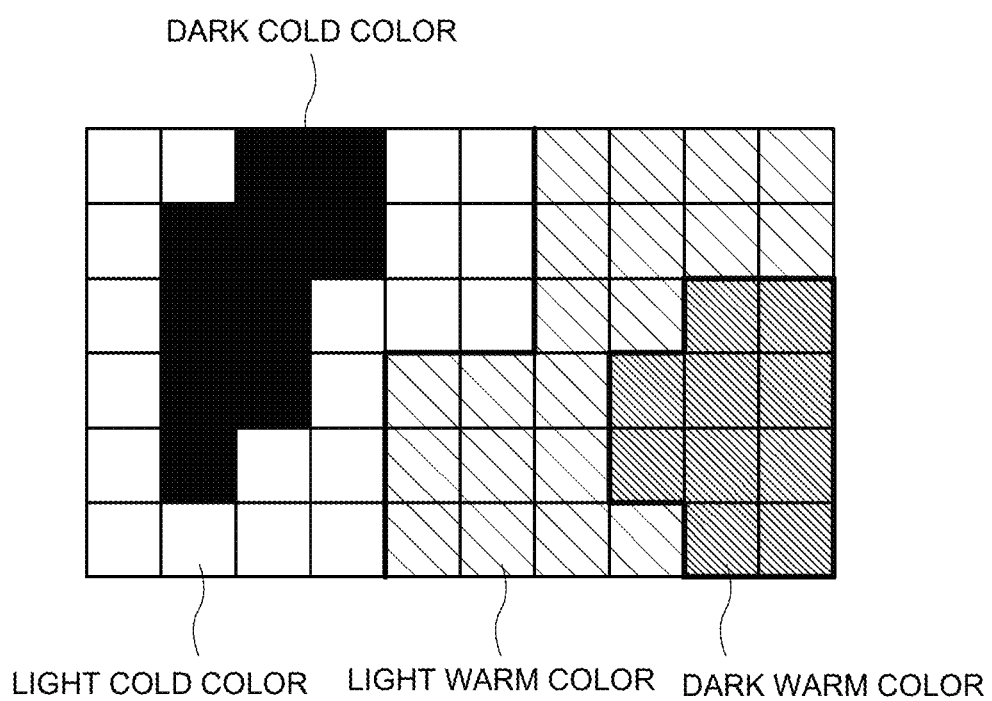
FIG. 19 is a diagram illustrating a method for calculating a ratio of dark color areas.

The method for calculating the total ratio of the recessed areas having a large elevation difference and the protruded areas having a large elevation difference is described with reference to FIG. 19. FIG. 19 is an example of a schematic diagram of a part of a predetermined area, illustrating 60 detection areas.

As the total ratio of the recessed areas having a large elevation difference and the protruded areas having a large elevation difference, the total ratio of the recessed areas having a large elevation difference and the protruded areas having a large elevation difference with respect to all the detection areas in the predetermined area is calculated. Specifically, in the schematic diagram of FIG. 19, the number of all the detection areas is 60, the number of detection areas that are recessed areas (areas in a dark warm color) having a large elevation difference is 10, and the number of detection areas (areas in a dark cold color) that are protruded areas having a large elevation difference is 10. Therefore, the total ratio of the recessed areas having a large elevation difference and the protruded areas having a large elevation difference is calculated as (10+10)/60=0.33.

The third ratio calculation unit 120 calculates, based on the comparison result by the comparison unit 115, the ratio of boundary portions (hue boundaries) between the detection area having the magnitude of the elevation difference of more than 0 and the detection area having the magnitude of the elevation difference of 0 or less in the predetermined area. That is, the third ratio calculation unit 120 calculates, with respect to the entire predetermined area, the ratio of the hue boundaries between the recessed area (area in a warm color) with respect to the repair plan surface and the protruded area (area in a cold color) with respect to the repair plan surface.

Figure 20:
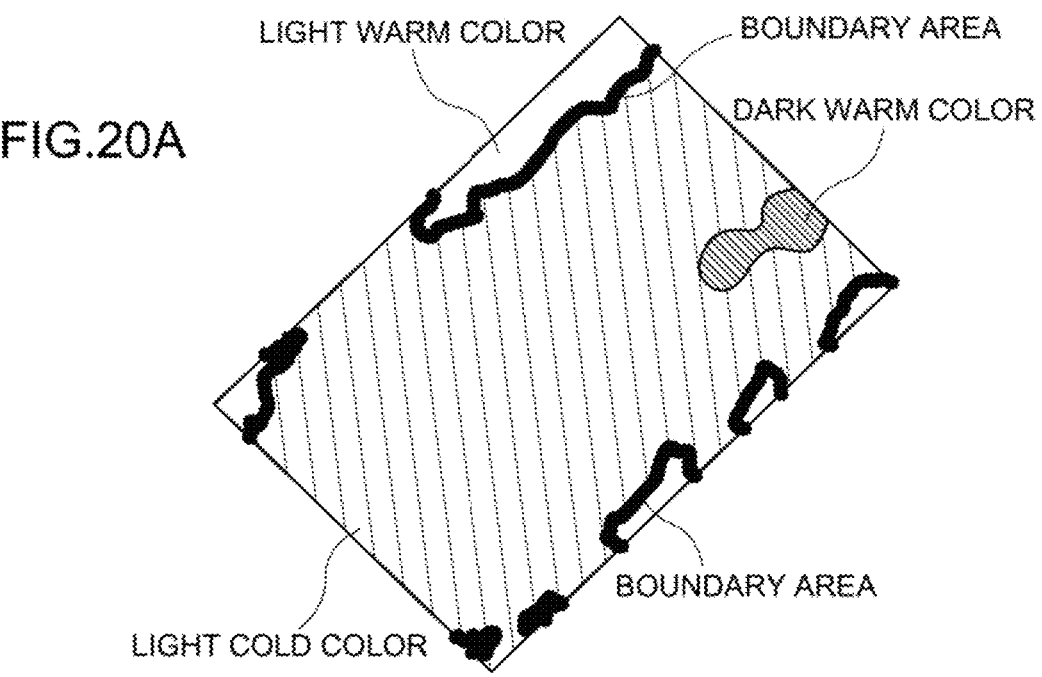
FIGS. 20A, 20B and 20C are a diagram illustrating a method for calculating a ratio of hue boundaries.

The method for calculating the ratio of the hue boundaries is described with reference to FIGS. 20A, 20B and 20C. FIG. 20A is a diagram illustrating a boundary area for the predetermined area b, and FIG. 20B is an example of a schematic diagram of a part of the predetermined area, illustrating 25 detection areas. For the sake of explanation, in detection areas of five rows and five columns, for example, the detection area in a first row and a first column is described as a11 and the detection area in the first row and a second column is described as $a_{12}$.

FIG. 20B illustrates a simplified grid obtained by separating the color of each detection area by RGB and determining whether the color is either a warm color or a cold color based on the percentage of R components and B components. Specifically, in FIG. 20B, the detection area with diagonal lines represents an area in a warm color, and the detection area without diagonal lines represents an area in a cold color.

In FIG. 20B sequentially for all the detection areas, starting from upper left, it is determined that the detection area is a boundary area when there is an adjacent detection area having a different color on the left or top.

Specifically, with regard to the detection area an, as there is no detection area on the left or top, it is determined that there is no adjacent detection area having a different color.

With regard to a detection area $a_{12}$, as there is a detection area having the identical color on the left and there is no detection area on the top, it is determined that there is no adjacent detection area having a different color.

With a detection area $a_{14}$, as there is a detection area having a different color on the left, it is determined that there is an adjacent detection area having a different color and it is determined that the detection area $a_{14}$ is a boundary area.

Subsequently, with regard to all the detection areas, it is determined whether the detection area is a boundary area in the same manner so that, as illustrated in FIG. 20C, it is determined that five detection areas are boundary areas.

As the ratio of the hue boundaries, the ratio of the boundary areas to all the detection areas in the predetermined area is calculated. Specifically, in FIG. 20C, the number of all the detection areas is 25, the number of boundary areas is 5, and therefore the ratio of the hue boundaries is calculated as 5/25=0.2. Therefore, in the same manner, the ratio of the hue boundaries is calculated for the entire predetermined area, and the larger the ratio of the hue boundaries in the entire predetermined area, the more recessed areas and protruded areas are mixed in the predetermined area.

Table 1 describes, with regard to the predetermined area a, the predetermined area b, and the predetermined area c, the ratios of the areas in a dark warm color, a light warm color, a light cold color, and a dark cold color, the ratio of the entire warm color (recessed areas), the ratio of the entire cold color (protruded areas), the ratio of the dark color areas, and the ratio of the hue boundaries with respect to the entire predetermined area.

(Color Tendency Determination)

The first determination unit 118a determines the state of the predetermined area based on the ratio calculated by the first ratio calculation unit 118. Specifically, as described in Table 2, the first determination unit 118a determines the state of the predetermined area based on the ratio of the entire warm color and the ratio of the entire cold color described in Table 1.

TABLE 2

| Warm Color Ratio (Cold Color Ratio) | Color Tendency Determination |
|---|---|
| 0 to 10%, 90 to 100% | Desirable |
| 10 to 30%, 70 to 90% | Acceptable |
| 30 to 70% | Undesirable |

As described in Table 1, as color tendency determination, it is determined that the predetermined area a is undesirable, the predetermined area b is desirable, and the predetermined area c is undesirable.

(Dark Color Determination)

The second determination unit 119a determines the state of the predetermined area based on the ratio calculated by the second ratio calculation unit 119. Specifically, as described in Table 3, the second determination unit 119a determines the state of the predetermined area based on the ratio of the dark color area described in Table 1.

TABLE 3

| Dark Color Area Ratio | Dark Color Determination |
|---|---|
| 5% or Less | Desirable |
| 5 to 10% | Acceptable |
| 10% or More | Undesirable |

As described in Table 1, as dark color determination, it is determined that the predetermined area a is desirable, the predetermined area b is desirable, and the predetermined area c is desirable.

(Boundary Area Determination)

The third determination unit 120a determines the state of the predetermined area based on the ratio calculated by the third ratio calculation unit 120. Specifically, as described in Table 4, the third determination unit 120a determines the state of the predetermined area based on the ratio of the hue boundary described in Table 1.

TABLE 1

| Predetermined Area | Dark Warm Color | Light Warm Color | Light Cold Color | Dark Cold Color | Entire Warm Color | Entire Cold Color | Dark Color Area | Hue Boundary | Color Tendency Determination | Dark Color Determination | Boundary Area Determination |
|---|---|---|---|---|---|---|---|---|---|---|---|
| a | 0% | 58.42% | 37.83% | 3.75% | 58.42% | 41.58% | 3.75% | 13.65% | Undesirable | Desirable | Undesirable |
| b | 0.90% | 89.29% | 9.81% | 0% | 90.19% | 9.81% | 0.90% | 8.28% | Desirable | Desirable | Acceptable |
| c | 0% | 35.48% | 64.52% | 0% | 35.48% | 61.52% | 0% | 18.23% | Undesirable | Desirable | Undesirable |

TABLE 4

| Boundary Area Ratio | Boundary Area Determination |
|---|---|
| 5% or Less | Desirable |
| 5 to 10% | Acceptable |
| 10% or More | Undesirable |

As described in Table 1, as boundary area determination, it is determined that the predetermined area a is undesirable, the predetermined area b is acceptable, and the predetermined area c is undesirable.

Therefore, based on the color tendency determination, the dark color determination, and the boundary area determination, it is understood that the predetermined area b is an area having relatively little unevenness while the predetermined area a and the predetermined area c are areas having much unevenness.

Figure 21:
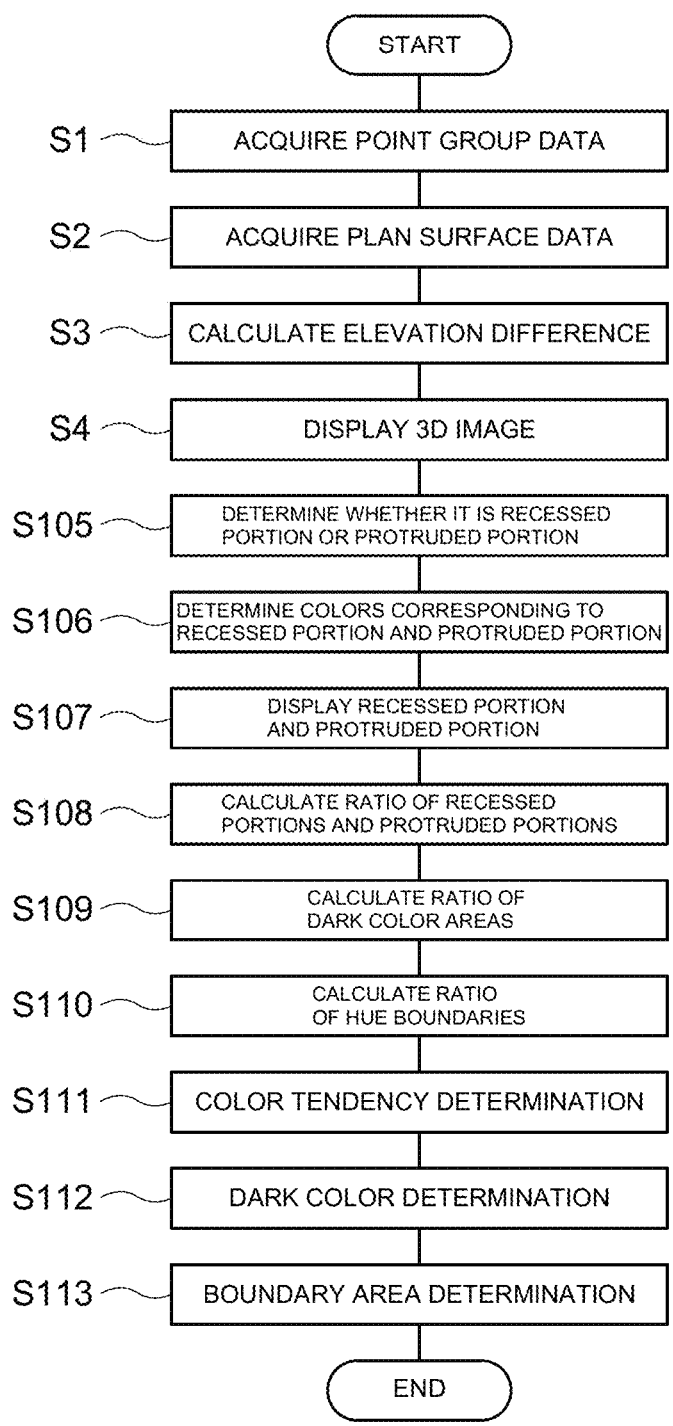
FIG. 21 is a flowchart illustrating an elevation difference detection method of the elevation difference detection system of FIG. 15.

The elevation difference detection method by the elevation difference detection system 101 according to the present embodiment will be described with reference to FIG. 21.

Step S1 (point group data acquisition step), Step S2 (reference surface data acquisition step), Step S3 (elevation difference calculation step), and Step S4 (image display step) are the same as those in the first embodiment, and therefore the detailed description is omitted.

At Step S105 (comparison step), the magnitude of the elevation difference is compared with the predetermined value for each identical plane position in the predetermined area. According to the present embodiment, as the predetermined value is 0, it is determined whether it is either a recessed portion or protruded portion with respect to the repair plan surface.

At Step S106 (second color determination step), the second color determination unit 116 determines the color corresponding to the magnitude of the elevation difference for each identical plane position in the predetermined area calculated at Step S3. According to the present embodiment, a warm color (dark warm color or light warm color) is determined for the recessed area, and a cold color (dark cold color or light cold color) is determined for the protruded area.

At Step S107 (second elevation difference color display step), the display unit 5 displays the elevation difference in the predetermined area by adding the color determined at Step S106 to the 3D image of the predetermined area of the road surface displayed on the display unit 5. That is, the recessed area and the protruded area are displayed for the predetermined area.

At Step S108 (first ratio calculation step), the ratio of the detection areas having the magnitude of the elevation difference of more than 0 in the predetermined area and the ratio of the detection areas having the magnitude of the elevation difference of 0 or less in the predetermined area are calculated. Specifically, the ratio of the recessed areas (areas in a warm color) with respect to the repair plan surface to the protruded areas (areas in a cold color) with respect to the repair plan surface is calculated.

At Step S109 (second ratio calculation step), the total ratio of dark color areas in the predetermined area is calculated. Specifically, the total ratio of areas in a dark warm color and areas in a dark cold color is calculated.

At Step S110 (third ratio calculation step), the ratio of boundary portions (hue boundaries) between the detection area having the magnitude of the elevation difference of more than 0 in the predetermined area and the detection area having the magnitude of the elevation difference of 0 or less is calculated. Specifically, the ratio of hue boundaries between the recessed area (area in a warm color) with respect to the repair plan surface and the protruded area (area in a cold color) with respect to the repair plan surface is calculated.

At Step S111 (first determination step), the state of the predetermined area is determined based on the ratio calculated at Step S108. Specifically, the state of the predetermined area is determined based on the ratio of the entire recessed portions and the ratio of the entire protruded portions, as described in Table 2.

At Step S112 (second determination step), the state of the predetermined area is determined based on the ratio calculated at Step S109. Specifically, the state of the predetermined area is determined based on the total ratio of dark color areas, as described in Table 3.

At Step S113 (third determination step), the state of the predetermined area is determined based on the ratio calculated at Step S110. Specifically, the state of the predetermined area is determined based on the ratio of hue boundaries, as described in Table 4.

The elevation difference detection method according to the present embodiment includes: the comparison step for comparing the magnitude of the elevation difference calculated at the elevation difference calculation step with 0 (the predetermined value) for each identical detection area in the predetermined area; the first ratio calculation step for calculating, based on the comparison result at the comparison step, the ratio of the detection areas having the magnitude of the elevation difference of more than 0 (the predetermined value) in the predetermined area and the ratio of the detection areas having the magnitude of the elevation difference of 0 (the predetermined value) or less in the predetermined area; and the first determination step for determining the state of the predetermined area based on the ratio calculated at the first ratio calculation step.

The elevation difference detection system 101 according to the present embodiment includes: the comparison unit 115 that compares the magnitude of the elevation difference calculated by the elevation difference calculation unit 14 with 0 (the predetermined value) for each identical detection area in the predetermined area; the first ratio calculation unit 118 that calculates, based on the comparison result by the comparison unit 115, the ratio of the detection areas having the magnitude of the elevation difference of more than 0 (the predetermined value) in the predetermined area and the ratio of the detection areas having the magnitude of the elevation difference of 0 (the predetermined value) or less in the predetermined area; and the first determination unit 118a that determines the state of the predetermined area based on the ratio calculated by the first ratio calculation unit 118.

Accordingly, with the elevation difference detection method and the elevation difference detection system 101 according to the present embodiment, based on the comparison result obtained by comparing the magnitude of the elevation difference with 0 (the predetermined value) for each identical detection area in the predetermined area, the ratio of the detection areas having the magnitude of the elevation difference of more than 0 (the predetermined value) or the ratio of the detection areas having the magnitude of the elevation difference of 0 (the predetermined value) or less is calculated, and the state of the predetermined area is determined based on the ratio. Therefore, the state of the predetermined area is automatically determined, and there is no need for the inspector to determine the state of the predetermined area.

The elevation difference detection method according to the present embodiment includes: the image display step for displaying, on the display unit, a three-dimensional image based on the point group data acquired at the point group data acquisition step; the second color determination step for determining, for each detection area, the color corresponding to either the detection area having the magnitude of the elevation difference of more than 0 (the predetermined value) or the detection area having the magnitude of the elevation difference of 0 (the predetermined value) or less; and the second elevation difference color display step for adding the color determined at the second color determination step to the three-dimensional image displayed at the image display step to display the elevation difference in the predetermined area.

The elevation difference detection system 101 according to the present embodiment includes: the display control unit 117 that displays, on the display unit 5, the three-dimensional image based on the point group data stored in the point group data storage unit 11a; and the second color determination unit 116 that determines, for each detection area, the color corresponding to either the detection area having the magnitude of the elevation difference of more than 0 (the predetermined value) or the detection area having the magnitude of the elevation difference of 0 (the predetermined value) or less, and the display control unit 117 adds the color determined by the second color determination unit 116 to the three-dimensional image displayed on the display unit 5 to display the elevation difference in the predetermined area.

Accordingly, with the elevation difference detection method and the elevation difference detection system 101 according to the present embodiment, the detection area having the magnitude of the elevation difference of more than 0 (the predetermined value) and the detection area having the magnitude of the elevation difference of 0 (the predetermined value) or less are displayed in different colors so that the state of the predetermined area may be easily detected.

The elevation difference detection method according to the present embodiment includes: the comparison step for comparing the magnitude of the elevation difference calculated at the elevation difference calculation step with 0 (the predetermined value) for each identical detection area in the predetermined area; the second ratio calculation step for calculating, based on the comparison result at the comparison step and with regard to the detection areas having the magnitude of the elevation difference of more than 0 (the predetermined value), the total ratio of the detection areas (detection areas in the first predetermined range) that have the magnitude of the elevation difference of more than 0 (the predetermined value) and that have the magnitude of the elevation difference of more than $a_1$ (here, $a_1$ is a number larger than 0) and the detection areas (detection areas in the second predetermined range) that have the magnitude of the elevation difference of 0 (the predetermined value) or less and that have the magnitude of the elevation difference of $a_2$ (here, $a_2$ is a number smaller than 0) or less; and the second determination step for determining the state of the predetermined area based on the ratio calculated at the second ratio calculation step.

The elevation difference detection system according to the present embodiment includes: the comparison unit 115 that compares the magnitude of the elevation difference calculated by the elevation difference calculation unit 14 with 0 (the predetermined value) for each identical detection area in the predetermined area; the second ratio calculation unit 119 that calculates, based on the comparison result by the comparison unit 115, the total ratio of the detection areas that have the magnitude of the elevation difference of more than 0 (the predetermined value) and that have the magnitude of the elevation difference of more than $a_1$ (here, $a_1$ is a number larger than 0) and the detection areas that have the magnitude of the elevation difference of 0 (the predetermined value) or less and that have the magnitude of the elevation difference of $a_2$ (here, $a_2$ is a number smaller than 0) or less; and the second determination unit 119*a* that determines the state of the predetermined area based on the ratio calculated by the second ratio calculation unit 119.

Accordingly, with the elevation difference detection method and the elevation difference detection system according to the present embodiment, the ratio of the detection areas having a very large magnitude of the elevation difference is calculated based on the comparison result obtained by comparing the magnitude of the elevation difference with 0 (the predetermined value) for each identical detection area in the predetermined area, and the state of the predetermined area is determined based on the ratio. Therefore, the state of the predetermined area is automatically determined, and thus there is no need for the inspector to determine the state of the predetermined area.

The elevation difference detection method according to the present embodiment includes: the image display step for displaying, on the display unit, the three-dimensional image based on the point group data acquired at the point group data acquisition step; the third color determination step for determining, for each detection area, the color corresponding to either the detection areas (detection areas in the first predetermined range) that have the magnitude of the elevation difference of more than 0 and that have the magnitude of the elevation difference of more than $a_1$ (here, $a_1$ is a number larger than 0) or the detection areas (detection areas in the second predetermined range) that have the magnitude of the elevation difference of 0 or less and that have the magnitude of the elevation difference of $a_2$ (here, $a_2$ is a number smaller than 0) or less; and the third elevation difference color display step for adding the color determined at the third color determination step to the three-dimensional image displayed at the image display step to display the elevation difference in the predetermined area.

The elevation difference detection system according to the present embodiment includes: the display control unit 117 that displays, on the display unit, the three-dimensional image based on the point group data stored in the point group data storage means; and the second color determination unit 116 that determines, for each detection area, the color corresponding to either the detection areas (detection areas in the first predetermined range) that have the magnitude of the elevation difference of more than 0 and that have the magnitude of the elevation difference of more than $a_1$ (here, $a_1$ is a number larger than 0) or the detection areas (detection areas in the second predetermined range) that have the magnitude of the elevation difference of 0 or less and that have the magnitude of the elevation difference of $a_2$ (here, $a_2$ is a number smaller than 0) or less, and the display control unit 117 adds the color determined by the second color determination unit 116 to the three-dimensional image displayed by the image display means to display the elevation difference in the predetermined area.

Accordingly, with the elevation difference detection method and the elevation difference detection system according to the present embodiment, the detection area having a very large magnitude of the elevation difference is displayed in the corresponding color so that the state of the predetermined area may be easily detected.

The elevation difference detection method according to the present embodiment includes: the comparison step for comparing the magnitude of the elevation difference calculated at the elevation difference calculation step with 0 (the predetermined value) for each identical detection area in the predetermined area; the third ratio calculation step for calculating, based on the comparison result at the comparison step, the ratio of boundary portions between the detection area having the magnitude of the elevation difference of more than 0 (the predetermined value) and the detection area having the magnitude of the elevation difference of 0 (the predetermined value) or less in the predetermined area; and the third determination step for determining the state of the predetermined area based on the ratio calculated at the third ratio calculation step.

The elevation difference detection system 101 according to the present embodiment includes: the comparison unit 115 that compares the magnitude of the elevation difference calculated by the elevation difference calculation unit 14 with 0 (the predetermined value) for each identical detection area in the predetermined area; the third ratio calculation unit 120 that calculates, based on the comparison result by the comparison unit 115, the ratio of boundary portions between the detection area having the magnitude of the elevation difference of more than 0 (the predetermined value) and the detection area having the magnitude of the elevation difference of 0 (the predetermined value) or less in the predetermined area; and the third determination unit 120a that determines the state of the predetermined area based on the ratio calculated by the third ratio calculation unit 120.

Accordingly, with the elevation difference detection method and the elevation difference detection system 101 according to the present embodiment, based on the comparison result obtained by comparing the magnitude of the elevation difference with 0 (the predetermined value) for each identical detection area in the predetermined area, the ratio of boundary portions between the detection area having the magnitude of the elevation difference of more than 0 (the predetermined value) and the detection area having the magnitude of the elevation difference of 0 (the predetermined value) or less is calculated, and the state of the predetermined area is determined based on the ratio. Therefore, the state of the predetermined area is automatically determined, and thus there is no need for the inspector to determine the state of the predetermined area.

Third Embodiment

A longitudinal profile generation system 201 serving as a ground information detection system according to an embodiment of the present invention includes a 3D scanner 202 (three-dimensional scanning device) installed at a known point, a UAV 203 (unmanned aerial vehicle) that is an unmanned aircraft serving as a capturing device, and a longitudinal profile generation device 210 that is wirelessly connected to the 3D scanner 202 and the UAV 203.

The 3D scanner 202 emits laser light to thus acquire each point on and around the road surface as point group data (a set of elevations having plane position coordinates) generated as three-dimensional coordinates and feeds the point group data to the longitudinal profile generation device 210. The 3D scanner 202 emits line laser light for example in a vertical direction and a horizontal direction to a measurement target (road surface) and measures the time it takes for a laser pulse to travel back and forth between a measurement point on the measurement target and a sensor so as to obtain the distance to the measurement point. The longitudinal profile of the road surface (indicating changes in the height of the road surface) is needed for an evaluation based on the international roughness index as described above, and the data at intervals of 25 cm or less on a linear path is needed. Therefore, the point group data acquired by the 3D scanner 202 is data in positions at intervals of, for example, 25 cm or less, and according to the present embodiment, the 3D scanner 202 acquires the point group data in positions at intervals of, for example, 5 mm. Thus, it is possible to detect elevations of the road surface at small intervals, and it is possible to properly detect unevenness of the road surface. The UAV 203 captures the road surface from above, acquires the capture data, and feeds the capture data to the longitudinal profile generation device 210.

Figure 23:
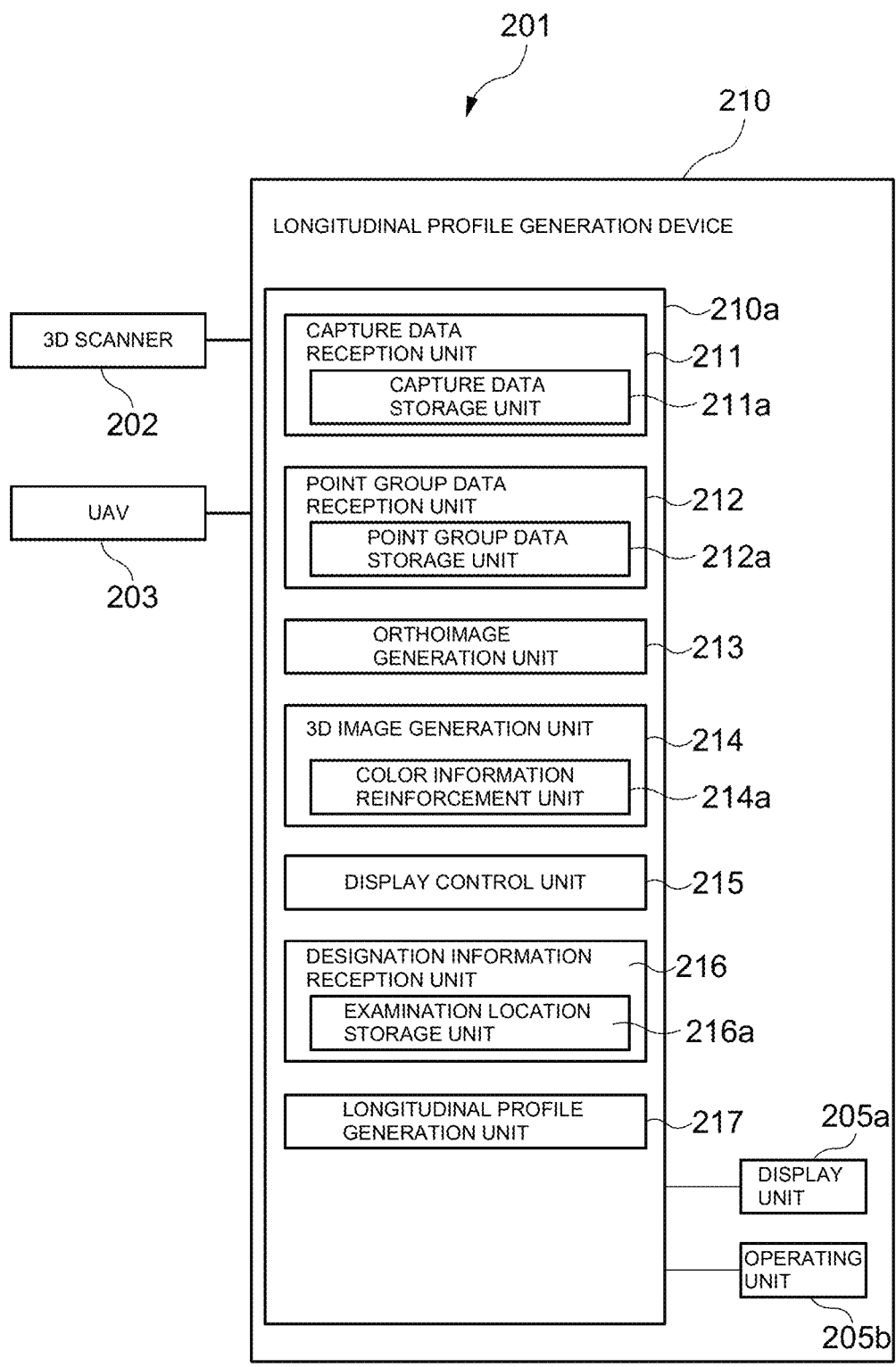
FIG. 23 is a flowchart illustrating a schematic configuration of a longitudinal profile generation system according to a third embodiment of the present invention.

As illustrated in FIG. 23, the longitudinal profile generation device 210 includes a control unit 210a, and the control unit 210a includes for example a microcomputer, including a CPU, a ROM storing a program for controlling an operation of the longitudinal profile generation device 210, and a RAM temporarily storing data, and the like, used for executing the above-described program. Specifically, the control unit 210a primarily includes a typical microcomputer including a CPU, a memory, and an interface to perform a predetermined operation and process in accordance with a longitudinal profile generation program stored in the memory and generate a longitudinal profile based on the data fed from the 3D scanner 202 and the UAV 203 in cooperation with the peripheral hardware.

The control unit 210a of the longitudinal profile generation device 210 includes a capture data reception unit 211 including a capture data storage unit 211a, a point group data reception unit 212 including a point group data storage unit 212a, an orthoimage generation unit 213, a 3D image generation unit 214 including a color information reinforcement unit 214a, a display control unit 215, a designation information reception unit 216 including an examination location storage unit 216a, and a longitudinal profile generation unit 217. The control unit 210a of the longitudinal profile generation device 210 is connected to a display unit 205a, such as a display screen, and an operating unit 205b.

The capture data reception unit 211 receives the capture data fed from the UAV 203. The capture data storage unit 211a stores the capture data fed from the UAV 203.

The point group data reception unit 212 receives the point group data for each point on the road surface fed from the 3D scanner 202. The point group data storage unit 212a stores the point group data for each point on the road surface fed from the 3D scanner 202. The point group data includes the data corresponding to the latitude, longitude, and height for each point on the road surface.

The orthoimage generation unit 213 generates an orthoimage based on the capture data that is captured by the UAV 3. Specifically, the orthoimage generation unit 213 executes SfM (structure from motion) analysis, or the like, on the capture data to generate an orthoimage.

The 3D image generation unit 214 generates a 3D image of the road surface based on the point group data stored in the point group data storage unit 212a. The 3D image generation unit 214 includes the color information reinforcement unit 214a. The color information reinforcement unit 214a reinforces the color information in the point group data stored in the point group data storage unit 212a based on the orthoimage generated by the orthoimage generation unit 213.

Figure 24A:
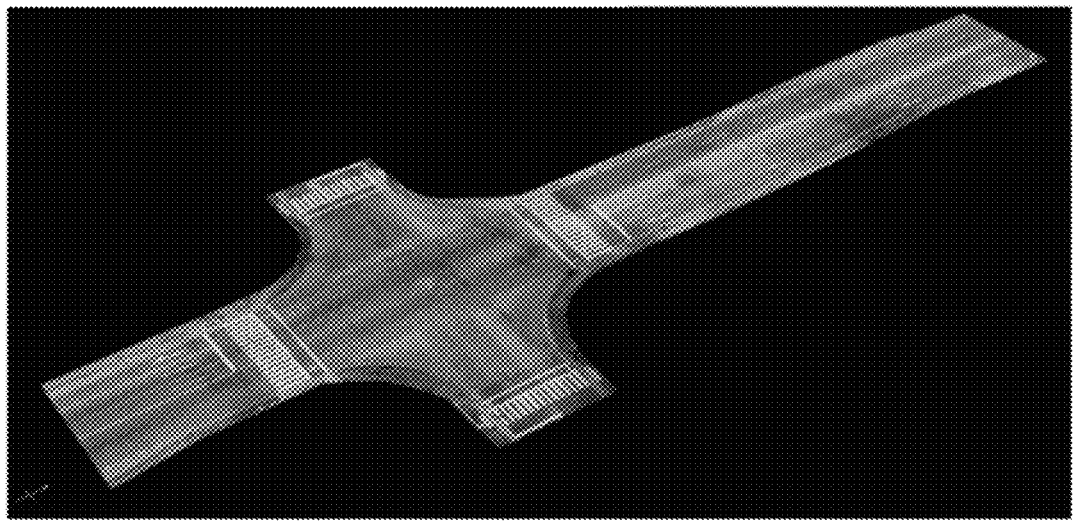
FIG. 24A illustrates a 3D image generated based on the point group data whose color information has been reinforced.
Figure 24B:
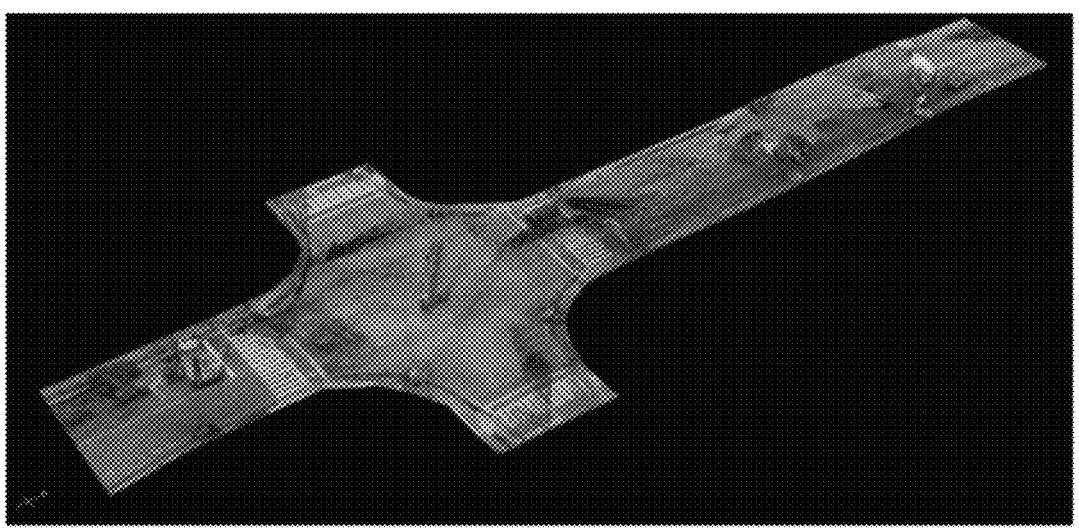
FIG. 24B is a typical 3D image generated based on the point group data whose color information has not been reinforced.

As illustrated in FIGS. 24A and 24B, the 3D image generation unit 214 generates the 3D image of the road surface based on the point group data having the color information reinforced by the color information reinforcement unit 214a. FIG. 24A illustrates the 3D image generated based on the point group data whose color information has been reinforced, and FIG. 24B illustrates the typical 3D image generated based on the point group data whose color information has not been reinforced. Thus, according to the present embodiment, the 3D image generated based on the point group data whose color information has been reinforced produces a clear color and enables a detailed understanding of road division lines, etc., as compared with the typical 3D image generated based on the point group data whose color information has not been reinforced.

The display control unit 215 controls the content displayed on the display unit 205a. For example, the display control unit 215 displays a 3D image generated by the 3D image generation unit 214 on the display unit 205a. The display control unit 215 displays the longitudinal profile generated by the longitudinal profile generation unit 217 on the display unit 205a.

Figure 25:
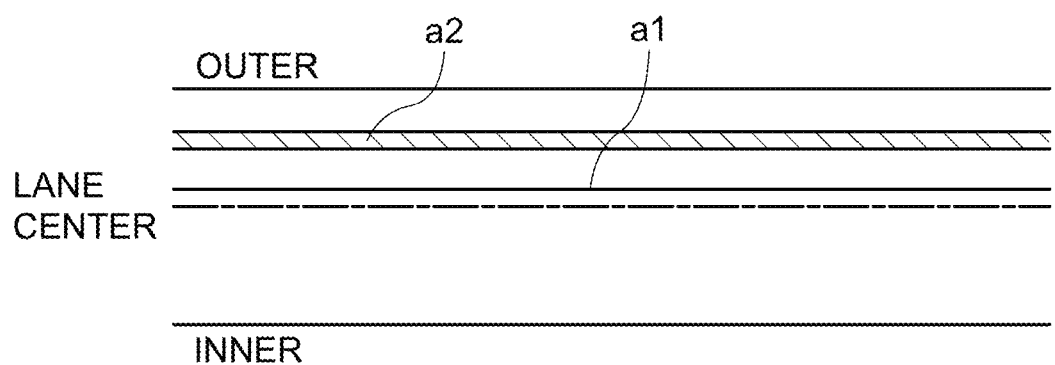
FIG. 25 is a diagram illustrating an example of a linear examination location on a road surface.
Figure 26A:
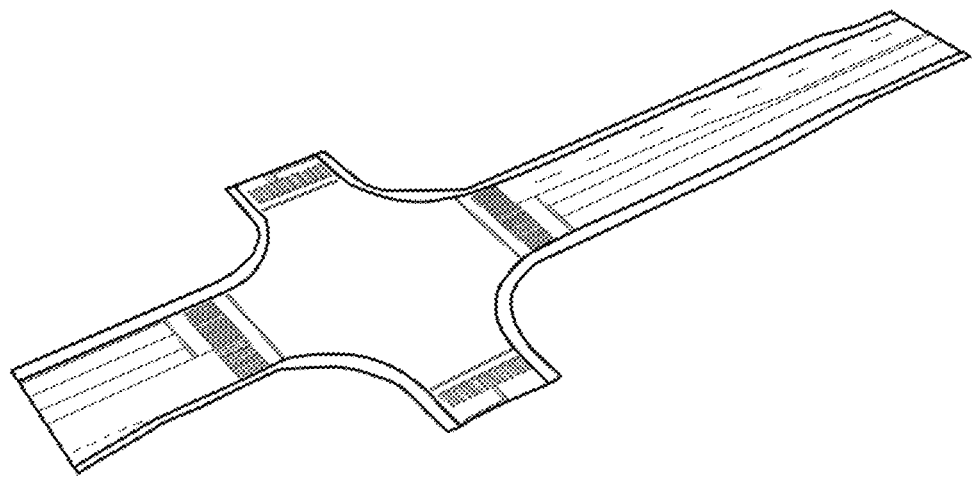
FIG. 26A illustrates a. 3D image of the road surface displayed on a display unit.
Figure 26B:
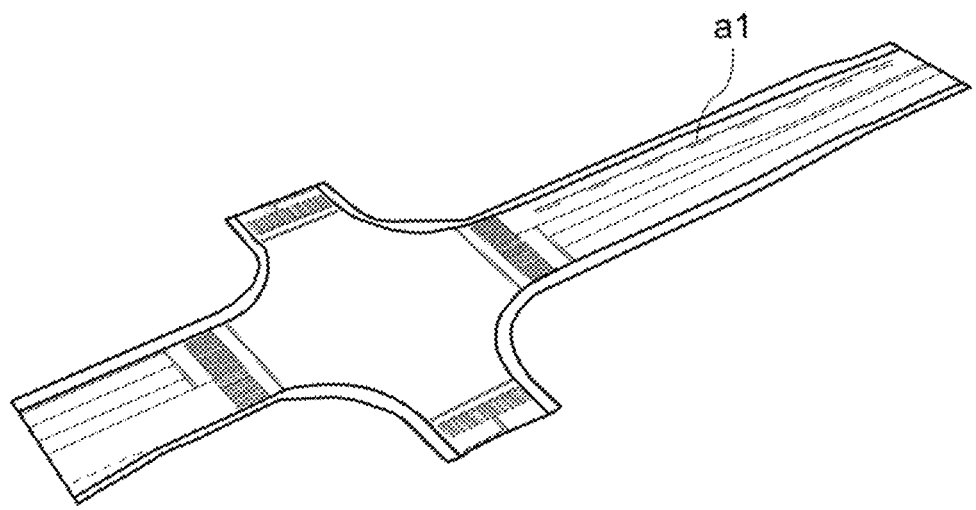
FIG. 26B illustrates a state in which a linear examination location has been designated on the 3D image of the road surface displayed on the display unit.

The designation information reception unit 216 receives designation in of about a linear examination location on the road surface designated by an operation on the operating unit 205b. The examination location storage unit 216a stores the linear examination location on the road surface designated by an operation on the operating unit 205b. Specifically, when a start point (point of origin), an end point, and a path between the start point and the end point are designated in the 3D image displayed on the display unit 205a by an operation on the operating unit 205b, the examination location storage unit 216a stores the designation information about the linear examination location. According to the present embodiment, as illustrated in FIG. 25, in order to examine the flatness of the road surface, a linear examination location is designated at a position a1 by 100 cm from the center of the lane to the road shoulder side or at an outer wheel passing position a2 of the lane of the road. FIG. 26A illustrates the 3D image of the road surface displayed on the display unit 205a, and FIG. 26B illustrates a state where the linear examination location a1 is designated in the 3D image of the road surface displayed on the display unit 205a by an operation on the operating unit 205b. For example, the international roughness index may be calculated with a longitudinal profile generated based on the data corresponding to the latitude, longitude, and height at each point in the single linear examination location.

The longitudinal profile generation unit 217 derives the data corresponding to the latitude, longitude, and height at each point in the linear examination location stored in the examination location storage unit 216a based on the point group data stored in the point group data storage unit 212a and generates the longitudinal profile of the road surface (indicating changes in the height of the road surface). According to the present embodiment, the longitudinal profile of the road surface includes the data corresponding to the latitude, longitude, and height of the start point, the data corresponding to the latitude, longitude, and height of the end point, and the data corresponding to the latitude, longitude, and height of the path between the start point and the end point at equal intervals. According to the present embodiment, the longitudinal profile generation unit 217 extracts data at intervals of 25 cm or less (at equal intervals of 20 cm according to the present embodiment) in the path between the start point and the end point and generates the longitudinal profile of the road surface. Any interval may be set as the interval for extracting data in the path between the start point and the end point.

Figure 27:
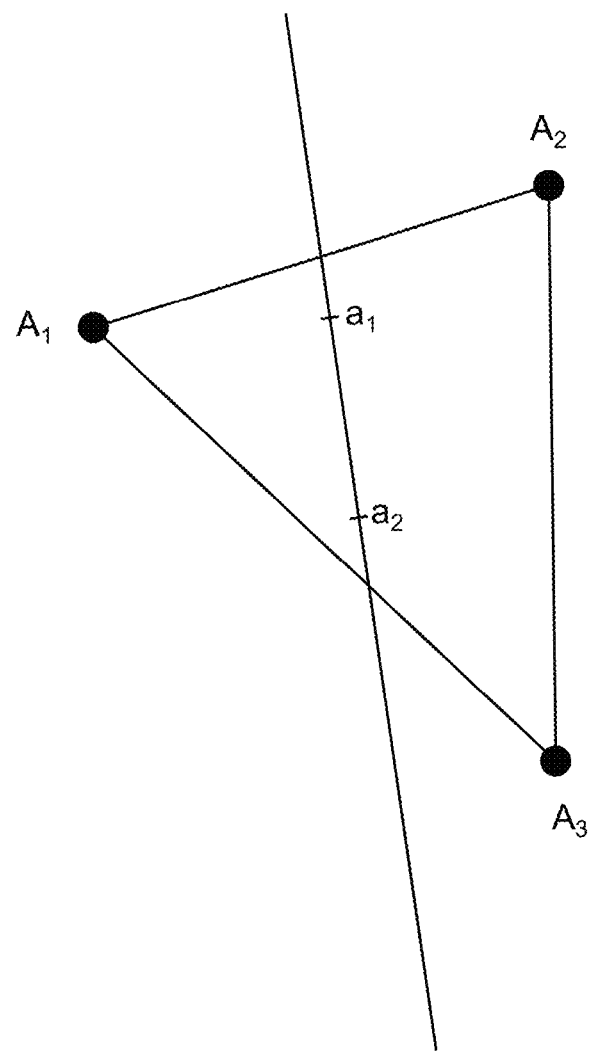
FIG. 27 is a diagram illustrating a method for converting the point group data into a three-dimensional TIN model and deriving the data for each point in the examination location.

Specifically, as illustrated in FIG. 27, the longitudinal profile generation unit 217 converts the point group data acquired by the 3D scanner 202 into a three-dimensional triangulated irregular network (TIN) model, which is a collection of triangular planes connected with the point group data as vertices based on the point group data stored in the point group data storage unit 212a, and derives the data corresponding to the latitude, longitude, and height at each point in the linear examination location stored in the examination location storage unit 216a. Therefore, the longitudinal profile generation unit 217 may derive the data corresponding to the latitude, longitude, and height at each point in the linear examination location even when the point group data on each point in the linear examination location stored in the examination location storage unit 216a is not stored in the point group data storage unit 212a. In FIG. 27, when the point group data storage unit 212a stores the point group data of a point $A_1$, a point $A_2$, and a point $A_3$, the point group data is converted into a three-dimensional TIN model, which is a collection of triangular planes connected with the point $A_1$, the point $A_2$, and the point $A_3$ as vertices. It is assumed that a point $a_1$ and a point $a_2$ on the linear examination location are present inside the triangular plane and are present on the plane passing through the point $A_1$, the point $A_2$, and the point $A_3$, and the data corresponding to the heights at the point $a_1$ and the point $a_2$ is derived.

As illustrated in FIG. 28, the longitudinal profile generated by the longitudinal profile generation unit 217 includes the data corresponding to the latitude, longitude, and height of the linear examination location at equal intervals. In FIG. 28, a, b, and c are numerical values indicating the latitude, longitude, and height, respectively. In FIG. 28, data No. 1 is the data corresponding to the latitude, longitude, and height at the start point, data No. n is the data corresponding to the latitude, longitude, and height at the end point, and data No. 2 to No. n−1 are the data corresponding to the latitude, longitude, and height at equal intervals on the path between the start point and the end point.

Figure 29:
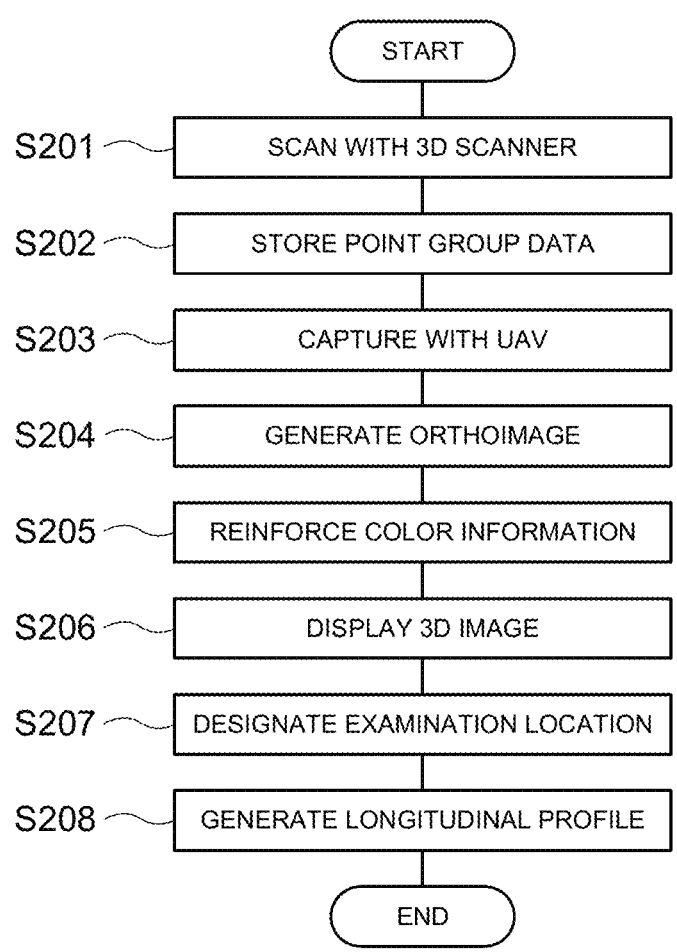
FIG. 29 is a flowchart illustrating a longitudinal profile generation method of the longitudinal profile generation system of FIG. 23.

The longitudinal profile generation method (ground information detection method) of the longitudinal profile generation system 201 according to the present embodiment will be described with reference to FIG. 29.

At Step S201 (point group data acquisition step), the 3D scanner 202, installed around the road, scans the road surface to acquire point group data and feeds the point group data to the longitudinal profile generation device 210.

At Step S202, in the longitudinal profile generation device 210, the point group data reception unit 212 receives the point group data fed from the 3D scanner 202, and the point group data storage unit 212a stores the point group data fed from the 3D scanner 202 to the longitudinal profile generation device 210.

At Step S203, the UAV 203 captures the road surface from above to acquire the capture data and feeds the capture data to the longitudinal profile generation device 210.

At Step S204, in the longitudinal profile generation device 210, the capture data reception unit 211 receives the capture data fed from the UAV 203, and the capture data storage unit 211a stores the capture data fed from the UAV 203 to the longitudinal profile generation device 210. Subsequently an orthoimage of the road surface is generated based on the capture data fed from the UAV 203 to the longitudinal profile generation device 210, and then the generated orthoimage is stored.

At Step S205, color information is reinforced in the point group data stored in the point group data storage unit 212a based on the orthoimage generated by the orthoimage generation unit 213.

At Step S206 (image display step), the 3D image of the road surface is generated based on the point group data whose color information has been reinforced, and the 3D image is displayed on the display unit 205a.

At Step S207 (examination location designation step), the linear examination location is designated on the 3D image of the road surface by an operation on the operating unit 205b while the display unit 205a displays the 3D image of the road surface. The designation information reception unit 216 receives the designation information about the examination location designated based on the operation on the operating unit 205b, and the examination location storage unit 216a stores the designation information.

At Step S208 (profile generation step), based on the point group data stored in the point group data storage unit 212a, the data corresponding to the latitude, longitude, and height at equal intervals in the designated linear examination location is derived to generate the longitudinal profile. The generated longitudinal profile is, for example, displayed on the display unit 205a for output.

According to the present embodiment, as described above, after the longitudinal profile is generated, the longitudinal profile is used and processed by a computer using a calculation program such as Proval to calculate the international roughness index.

The longitudinal profile generation method according to the present embodiment includes: the point group data acquisition step for acquiring point group data generated as three-dimensional coordinates for each point in the longitudinal direction of the road surface with laser light emitted from the 3D scanner 202 installed at a known point; the examination location designation step for designating the linear examination location in the longitudinal direction of the road surface; and the longitudinal profile generation step for deriving, based on the point group data acquired at the point group data acquisition step, the data corresponding to the heights at a plurality of positions on the linear examination location designated at the examination location designation step to generate the longitudinal profile of the road surface.

The longitudinal profile generation system according to the present embodiment includes: the 3D scanner 202 that is installed at a known point to emit laser light and thus acquires the point group data generated as three-dimensional coordinates for each point in the longitudinal direction of the road surface; the operating unit 205b that designates the linear examination location in the longitudinal direction of the road surface; and the longitudinal profile generation unit 217 that derives, based on the point group data acquired by the 3D scanner 202, the data corresponding to the heights at a plurality of positions on the linear examination location designated by the operating unit 205b to generate the longitudinal profile of the road surface.

The longitudinal profile generation program according to the present embodiment, when loaded into a computer, causes the computer to function as: the point group data reception unit 212 that receives the point group data generated as three-dimensional coordinates acquired for each point on the road surface with laser light emitted from the 3D scanner 202 installed at a known point; the designation information reception unit 216 that receives the designation information for designating the linear examination location on the road surface; and the profile generation unit 218 that derives, based on the point group data received by the point group data reception unit 212, the data corresponding to the heights at a plurality of positions on the linear examination location designated by the designation information received by the designation information reception unit 216 to generate the profile for the cross-section of the road surface.

Accordingly, with the longitudinal profile generation method, the longitudinal profile generation system, and the longitudinal profile generation program according to the present embodiment, the longitudinal profile of the road surface is generated based on the three-dimensional point group data that is typically acquired when the road is repaired. Therefore, it does not need to take a lot of time and effort to acquire the longitudinal profile of the road surface, as it is not necessary to conduct the measurement by the surveyor and the measurement by the road surface condition survey vehicle. In particular, the cost may be reduced as the measurement by the road surface condition survey vehicle is not needed. The longitudinal profile obtained according to the present invention is more accurate than the longitudinal profile based on the measurement by the surveyor or the measurement by the road surface condition survey vehicle and is as accurate as the longitudinal profile based on leveling survey.

In the longitudinal profile generation method according to the present embodiment, the longitudinal profile generation step derives, based on the point group data acquired at the point group data acquisition step, data corresponding to a latitude, longitude, and height at a plurality of positions on the linear examination location designated at the examination location designation step to generate the longitudinal profile.

In the longitudinal profile generation system according to the present embodiment, the longitudinal profile generation unit 217 derives, based on the point group data acquired by the 3D scanner 202, data corresponding to a latitude, longitude, and height at a plurality of positions on the linear examination location designated by the operating unit 205b to generate the longitudinal profile.

The longitudinal profile according to the present embodiment includes point group data acquired with laser light emitted from the 3D scanner 202 installed at a known point and includes data that is derived based on the point group data generated as three-dimensional coordinates for each point on a road surface and that corresponds to a latitude, longitude, and height at a plurality of positions on a predetermined linear examination location.

Accordingly, with the longitudinal profile generation method and the longitudinal profile generation system according to the present embodiment, the longitudinal profile is generated based on the data corresponding to the latitude, longitude, and height at the plurality of positions on the linear examination location. Therefore, the position of the longitudinal profile may be specified based on the latitude and longitude. The inclusion of the data corresponding to the latitude and longitude enables the use of a geographic information function in for example software called Proval.

In the longitudinal profile generation method according to the present embodiment, the examination location designation step designates, as the linear examination location, an outer wheel passing position in a lane of a road or a position away from a center of the lane to a road shoulder side by a predetermined distance.

In the longitudinal profile generation system according to the present embodiment, the operating unit 205b designates, as the linear examination location, an outer wheel passing position in a lane of a road or a position away from a center of the lane to a road shoulder side by a predetermined distance.

Accordingly, with the longitudinal profile generation method and the longitudinal profile generation system according to the present embodiment, generally, it is possible to generate the longitudinal profile used for calculating the international roughness index.

The longitudinal profile generation method according to the present embodiment includes an image display step for displaying, on the display unit 205a, a three-dimensional image based on the point group data acquired at the point group data acquisition step, and the examination location designation step designates the linear examination location on the three-dimensional image displayed on the display unit 205a.

The longitudinal profile generation system according to the present embodiment includes the display unit 205a that displays a three-dimensional image based on the point group data acquired by the 3D scanner 202, and the operating unit 205b designates the linear examination location on the three-dimensional image displayed on the display unit 205a.

Accordingly, with the longitudinal profile generation method and the longitudinal profile generation system according to the present embodiment, the linear examination location may be easily designated in the three-dimensional image displayed on the display unit 205a.

Although the embodiments of the present invention have been described above, the specific configuration of each unit is not limited to only the above-described embodiments, and various modifications may be made without departing from the spirit of the present invention.

According to the first embodiment above, when the predetermined position is designated, the numerical value indicating the elevation difference at the predetermined position and the numerical value indicating the size of the area surrounded by the line indicating the portion having the identical elevation difference near the predetermined position are displayed; however, the present invention includes displaying at least either the numerical value indicating the elevation difference at the predetermined position or the numerical value indicating the size of the area surrounded by the line indicating the portion having the identical elevation difference near the predetermined position.

Figure 22A:
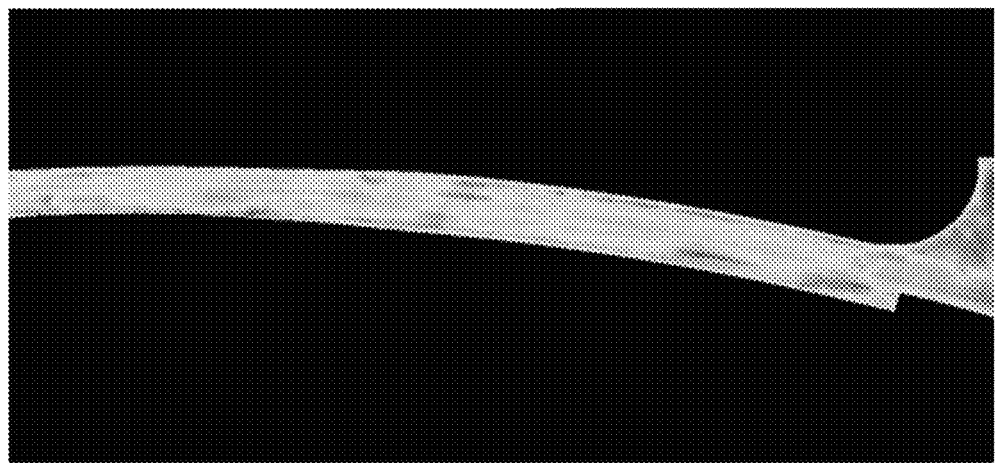
FIG. 22A is a diagram displaying, in color, the elevation difference in the predetermined area at the time of start of repair.
Figure 22B:
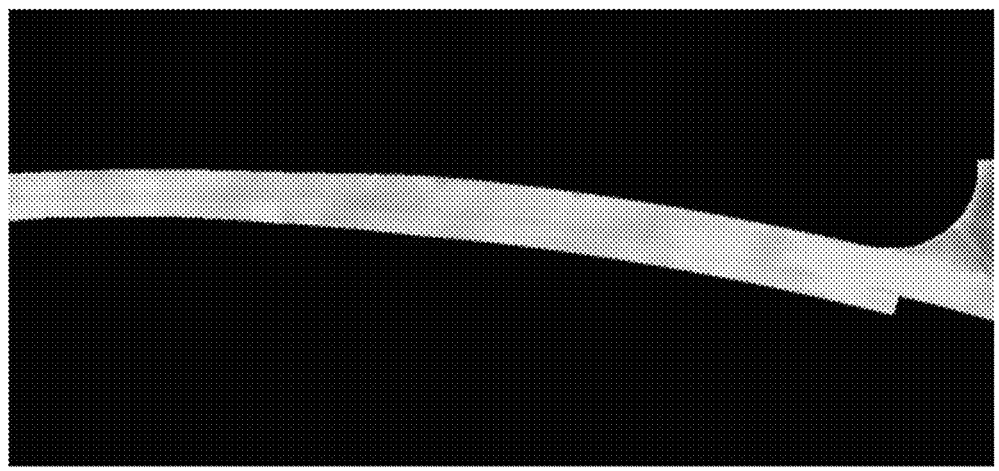
FIG. 22B is a diagram displaying, in color, the elevation difference in the predetermined area after repair.

In the case described according to the first embodiment above, as illustrated in FIG. 22A, the display unit 5 uses the plurality of colors to display the difference between the elevation at the time of start of road repair and the elevation of the repair plan surface for each plane position in the predetermined area of the road surface; however, the display unit 5 may use the plurality of colors to display the difference between the elevation after road repair and the elevation of the repair plan surface, as illustrated in FIG. 22B. In that case, after the road repair, the point group data for each point in the predetermined area of the road surface is acquired by the 3D scanner 2, the point group data is stored in the point group data storage unit 11a, and the difference between the elevation after the road repair and the elevation of the repair plan surface is calculated. At the time of start of repair, there is a location having a large elevation difference from the repair plan surface as illustrated in FIG. 22A, while after the repair there are almost no locations having a large elevation difference from the repair plan surface as illustrated in FIG. 22B, and thus it is indicated that the road repair has been conducted according to the repair plan.

Although the predetermined position is designated when the user presses the display surface 5a of the display unit 5 according to the above-described first embodiment, the method for designating the predetermined position is not limited thereto. Accordingly, the user may operate an operating unit included in the elevation difference detection device 10 to designate the predetermined position in the predetermined area.

According to the above-described second embodiment, the magnitude of the elevation difference is compared with 0, which is the predetermined value, for each identical plane position in the predetermined area and the area where the elevation at the time of start of repair is lower than the elevation of the repair plan surface is determined as a recessed portion and the area where the elevation at the time of start of repair is higher than the elevation of the repair plan surface is determined as a protruded portion; however, this is not a limitation. For example, the predetermined value for comparing the magnitude of the elevation difference may be a value other than 0.

According to the above-described second embodiment, the area where the elevation at the time of start of repair is lower than the elevation of the repair plan surface is displayed in a warm color (dark warm color or light warm color) and the area where the elevation at the time of start of repair is higher than the elevation of the repair plan surface is displayed in a cold color (dark cold color or light cold color); however, this is not a limitation. For example, each area may be displayed in any color.

Although examples of the methods for calculating the respective ratios by the first ratio calculation unit 118, the second ratio calculation unit 119, and the third ratio calculation unit 120 are described according to the above second embodiment, the methods for calculating the ratios are not limited thereto. Although examples of the determination methods by the first determination unit 118a, the second determination unit 119a, and the third determination unit 120a are described according to the above second embodiment, the determination methods are not limited thereto.

Although the state of the predetermined area is determined by color tendency determination, dark color determination, and hue boundary determination according to the above second embodiment, the state of the predetermined area may be determined by at least one of color tendency determination, dark color determination, and hue boundary determination.

According to the first embodiment and the second embodiment described above, the elevation difference calculation unit 14 calculates the elevation difference for each identical plane position in the predetermined area of the road surface based on the point group data for each point in the predetermined area of the road surface at the time of start of repair and the reference surface data, which is the plan surface data indicating the repair plan surface for repairing the predetermined area of the road surface; however, as the reference surface data, the road surface data when the predetermined area of the road surface has been newly provided or the road surface data when the predetermined area of the road surface has been repaired may be used instead of the plan surface data indicating the repair plan surface for repairing the predetermined area of the road surface.

That is, with the elevation difference detection method, the elevation difference detection system, and the elevation difference detection program according to the present invention, the elevation difference may be calculated for each identical plane position in the predetermined area of the road surface based on the point group data for each point in the predetermined area of the road surface at the time of repair and the reference surface data that is the road surface data when the predetermined area has been newly provided or the road surface data when the predetermined area has been repaired. The road surface data when the predetermined area has been newly provided or has been repaired is data indicating the surface state of the road surface at that time and data indicating the elevation at each plane position in the predetermined area when the predetermined area has been newly provided or has been repaired. For example, when the point group data for each point in the predetermined area of the road surface has been acquired by the three-dimensional scanning device (3D scanner) after the predetermined area of the road surface has been newly provided or has been repaired, the elevation difference may be calculated for each identical plane position in the predetermined area of the road surface by using the road surface data based on the point group data as the reference surface data. In that case, the surface state of the road surface after the predetermined area has been newly provided or has been repaired is a state having almost no damage such as depression, but the elevation at the time of repair is compared with the road surface data after the predetermined area has been newly provided or has been repaired so that it is possible to detect the unevenness of the road surface formed by damage such as depression after the predetermined area has been newly provided or has been repaired.

According to the above-described third embodiment, the data corresponding to the latitude, longitude, and height at the linear examination location is derived based on the point group data to generate the longitudinal profile; however, the data corresponding to at least the height at the linear examination location may be derived based on the point group data to generate the longitudinal profile. According to the above embodiment, the data corresponding to the latitude, longitude, and height at equal intervals in the linear examination location is derived based on the point group data to generate the longitudinal profile; however, the data corresponding to the latitude, longitude, and height at a plurality of positions in the linear examination location based on the point group data is not limited to data at equal intervals. Although the international roughness index is calculated based on the longitudinal profile of the road surface at the position on the road shoulder side from the center of the lane by the predetermined distance or at the outer wheel passing position in the lane of the road, half-car roughness index (HRI) or the IRI mean value (MRI) of the right and left wheel running positions may be calculated based on the longitudinal profile of the road surface at the position on the road shoulder side from the center of the lane by the predetermined distance, the outer wheel passing position in the lane of the road, and the inner wheel passing position in the lane of the road. Thus, according to the present invention, for example, the longitudinal profile of the road surface may be generated by extracting, from the point group data, the data corresponding to the latitude, longitude, and height at the position from the center of the lane to the road shoulder side by a predetermined distance, the outer wheel passing position in the lane of the road, and the inner wheel passing position in the lane of the road for each point in the linear examination location. According to the above-described embodiment, for example, the software called Proval is used for the profile (longitudinal profile), but software other than the software called Proval may be used as the analysis software for analyzing the profile (longitudinal profile).

According to the above-described third embodiment, capturing with the UAV is performed after scanning is executed with the 3D scanner; however, scanning with the 3D scanner may be executed after capturing with the UAV is performed.

According to the above-described third embodiment, after the color information is reinforced for the point group data based on the orthoimage, the 3D image is displayed based on the point group data whose color information has been reinforced; however, the color information for the point group data may be refrained from reinforcement, and the 3D image may be displayed based on the point group data whose color information has not been reinforced.

Figure 30:
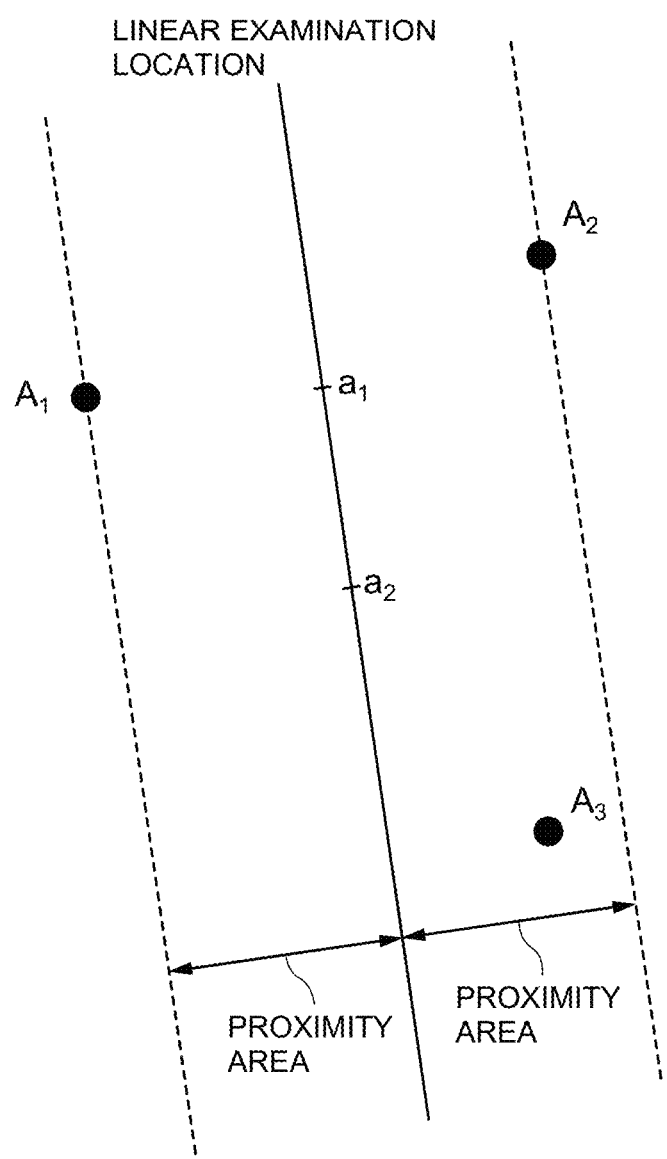
FIG. 30 is a diagram illustrating a modification of the method for deriving the data for each point in the examination location based on the point group data.

According to the above-described third embodiment, based on the point group data stored in the point group data storage unit 212a, the longitudinal profile generation unit 217 converts the point group data into a three-dimensional triangulated irregular network (TIN) model, which is a collection of triangular planes, and derives the data corresponding to the latitude, longitude, and height at each point in the linear examination location; however, as illustrated in FIG. 30, proximity areas may be formed on both sides of the linear examination location, and the data corresponding to the latitude, longitude, and height at each point in the linear examination location may be derived based on the point group data in the proximity areas. In FIG. 30, when the point group data storage unit 212a stores the point group data of the point $A_1$, the point $A_2$, and the point $A_3$, the point group data (one or more sets of point group data) near the point on the linear examination location may be selected from the point group data in the proximity areas and, based on the point group data, the data corresponding to the latitude, longitude, and height at each point in the linear examination location may be derived for the point $a_1$ and the point $a_2$ on the linear examination location. For example, the data corresponding to the height at the point $a_1$ on the linear examination location may be derived based on the average value of the heights at the point $A_1$ and the point and the data corresponding to the height at the point $a_2$ may be derived based on the average value of the heights at the point $A_1$ and the point $A_3$. The method for deriving the data corresponding to the height at the point in the linear examination location based on the point group data near the point on the linear examination location selected from among the point group data present in the proximity area is not limited thereto. Any width may be set for the proximity areas on both sides of the linear examination location. When the point group data stored in the point group data storage unit 212a includes the point group data of each point in the linear examination location, the data corresponding to the latitude, longitude, and height at each point in the linear examination location may be extracted from the point group data stored in the point group data storage unit. 212a.

Although the longitudinal profile of the road surface is generated according to the above-described third embodiment, the profile for the cross-section of the ground may be a profile of the ground (indicating changes in the height of the ground) other than the road surface. In the case of the profile of the road surface, for example, the transverse profile of the road surface may be used as well as the longitudinal profile of the road surface.

INDUSTRIAL APPLICABILITY

The present invention is applicable as, for example, the ground information detection method and the ground information detection system to detect the uneven state of the road surface.

REFERENCE SIGNS LIST

1 . . . Elevation difference display system (elevation difference display system)
2 . . . 3D scanner (three-dimensional scanning device)
5 . . . Display unit
5a . . . Display surface (operation detection means)
10 . . . Elevation difference detection device
11 . . . Point group data reception unit (point group data reception means)
11a . . . Point group data storage unit (point group data storage means)
12 . . . 3D image generation unit
13 . . . Plan surface data reception unit (reference surface data reception means)
13a . . . Plan surface data storage unit (reference surface data storage means)
14 . . . Elevation difference calculation unit (elevation difference calculation means)
15 . . . First color determination unit (first color determination means)
16 . . . Display control unit (display control means)
101 . . . Elevation difference display system (elevation difference display system)
110 . . . Elevation difference detection device
115 . . . Comparison unit (comparison means)
116 . . . Color determination unit (second color determination means, third color determination means)
117 . . . Display control unit (display control means)

118 . . . First ratio calculation unit (first ratio calculation means)
118a . . . First determination unit (first determination means)
119 . . . Second ratio calculation unit (second ratio calculation means)
119a . . . Second determination unit (second determination means)
120 . . . Third ratio calculation unit (third ratio calculation means)
120a . . . Third determination unit (third determination means)
201 . . . Longitudinal profile generation system (profile generation system)
202 . . . 3D Scanner (three-dimensional scanning device)
203 . . . UAV
205a . . . Display unit
205b . . . Operating unit (examination location designation means)
210 . . . Longitudinal profile generation device (profile generation device)
211 . . . Capture data reception unit
211a . . . Capture data storage unit
212 . . . Point group data reception unit (point group data reception means)
212a . . . Point group data storage unit
213 . . . Orthoimage generation unit
214 . . . 3D image generation unit
214a . . . Color information reinforcement unit
215 . . . Display control unit
216 . . . Designation information reception unit (designation information reception means)
216a . . . Examination location storage unit
217 . . . Longitudinal profile generation unit (profile generation means)

The invention claimed is:

1. A ground information detection method comprising:
a point group data acquisition step for acquiring point group data generated as three-dimensional coordinates for each point on a ground with laser light emitted from a three-dimensional scanning device installed at a known point; and
a ground information detection step for detecting ground information about an uneven state of the ground by using the point group data acquired at the point group data acquisition step,
wherein the point group data acquisition step acquires point group data generated as three-dimensional coordinates for each point in a predetermined area of a road surface at time of start of repair with the laser light emitted from the three-dimensional scanning device installed at the known point, and
the ground information detection step includes:
a reference surface data acquisition step for acquiring, as reference surface data, any of plan surface data indicating a repair plan surface for repairing the predetermined area, road surface data when the predetermined area has been newly provided, and road surface data when the predetermined area has been repaired; and
an elevation difference calculation step for calculating an elevation difference for each identical plane position in the predetermined area based on the point group data acquired at the point group data acquisition step and the reference surface data acquired at the reference surface data acquisition step.

2. The ground information detection method according to claim 1, comprising:
an image display step for displaying, on a display unit, a three-dimensional image based on the point group data acquired at the point group data acquisition step;
a first color determination step for determining a color corresponding to a magnitude of the elevation difference calculated at the elevation difference calculation step for each identical plane position in the predetermined area; and
a first elevation difference color display step for adding the color determined at the first color determination step to the three-dimensional image displayed at the image display step to display the elevation difference in the predetermined area.

3. The ground information detection method according to claim 2, comprising:
a designation step for designating a predetermined position in the predetermined area while the display unit displays the elevation difference in the predetermined area at the first elevation difference color display step; and
a numerical value display step for displaying, on the display unit, a numerical value indicating an elevation difference at the predetermined position when the predetermined position has been designated at the designation step.

4. The ground information detection method according to claim 1, comprising:
an image display step for displaying, on a display unit, a three-dimensional image based on the point group data acquired at the point group data acquisition step; and
an elevation difference line display step for displaying, on the three-dimensional image displayed at the image display step, a line indicating a portion having an identical elevation difference in the predetermined area in accordance with a magnitude of the elevation difference calculated at the elevation difference calculation step.

5. The ground information detection method according to claim 4, comprising:
a designation step for designating a predetermined position in the predetermined area while the display unit displays the elevation difference in the predetermined area at the elevation difference line display step; and
a numerical value display step for displaying, on the display unit, a numerical value indicating a size of an area surrounded by a line indicating a portion having an identical elevation difference near the predetermined position when the predetermined position has been designated at the designation step.

6. The ground information detection method according to claim 1, comprising:
a comparison step for comparing a magnitude of the elevation difference calculated at the elevation difference calculation step with a predetermined value for each identical plane position in the predetermined area;
a first ratio calculation step for calculating, based on a comparison result at the comparison step, at least either a ratio of plane positions having the magnitude of the elevation difference more than the predetermined value or a ratio of plane positions having the magnitude of the elevation difference equal to or less than the predetermined value; and
a first determination step for determining a state of the predetermined area based on the ratio calculated at the first ratio calculation step.

7. The ground information detection method according to claim 6, comprising:

an image display step for displaying, on a display unit, a three-dimensional image based on the point group data acquired at the point group data acquisition step;

a second color determination step for determining, for the each plane position, a color corresponding to either the plane position having the magnitude of the elevation difference more than the predetermined value or the plane position having the magnitude of the elevation difference equal to or less than the predetermined value; and a second elevation difference color display step for adding the color determined at the second color determination step to the three-dimensional image displayed at the image display step to display the elevation difference.

8. The ground information detection method according to claim 1, comprising:

a comparison step for comparing a magnitude of the elevation difference calculated at the elevation difference calculation step with a predetermined value for each identical plane position in the predetermined area;

a second ratio calculation step for calculating, based on a comparison result at the comparison step, at least either a ratio of plane positions that have a magnitude of the elevation difference more than the predetermined value and that have the magnitude of the elevation difference in a first predetermined range or a ratio of plane positions that have the magnitude of the elevation difference equal to or less than the predetermined value and that have the magnitude of the elevation difference in a second predetermined range; and a second determination step for determining a state of the predetermined area based on the ratio calculated at the second ratio calculation step.

9. The ground information detection method according to claim 8, comprising:

an image display step for displaying, on a display unit, a three-dimensional image based on the point group data acquired at the point group data acquisition step;

a third color determination step for determining, for the each plane position, a color corresponding to either the plane position having the magnitude of the elevation difference in the first predetermined range or the plane position having the magnitude of the elevation difference in the second predetermined range; and a third elevation difference color display step for adding, to the three-dimensional image displayed at the image display step, the color determined at the third color determination step to display the elevation difference in the predetermined area.

10. The ground information detection method according to claim 1, comprising:

a comparison step for comparing a magnitude of the elevation difference calculated at the elevation difference calculation step with a predetermined value for each identical plane position in the predetermined area;

a third ratio calculation step for calculating, based on a comparison result at the comparison step, a ratio of boundary portions between the plane position having the magnitude of the elevation difference more than the predetermined value in the predetermined area and the plane position having the magnitude of the elevation difference equal to or less than the predetermined value; and a third determination step for determining a state of the predetermined area based on the ratio calculated at the third ratio calculation step.

11. A ground information detection system comprising:

a three-dimensional scanning device that is installed at a known point to emit laser light and thus acquires point group data generated as three-dimensional coordinates for each point on a ground; and a computer that executes a ground information detection procedure for detecting ground information about an uneven state of the ground by using the point group data acquired by the three-dimensional scanning device, wherein the computer that executes the ground information detection procedure comprises:

a reference surface data acquisition step for acquiring as reference surface data, any of plan surface data indicating a repair plan surface for repairing the predetermined area, road surface data when the predetermined area has been newly provided, and road surface data when the predetermined area has been repaired; and an elevation difference calculation step for calculating an elevation difference for each identical plane position in the predetermined area based on the point group data generated as three-dimensional coordinates for each point in a redetermined area of a road surface at time of start of repair, acquired by the three-dimensional scanning device; and the reference surface data acquired stored in the reference surface data acquisition step.

12. The ground information detection system according to claim 11, comprising:

an image display step for displaying, on a display unit, a three-dimensional image based on the point group data acquired in the point group data acquisition; and a first color determination step for determining a color corresponding to a magnitude of the elevation difference calculated by the elevation difference calculation step for each identical plane position in the predetermined area, wherein the image display step for displaying adds the color determined by the first color determination step to the three-dimensional image displayed on the display unit to display the elevation difference in the predetermined area.

13. The ground information detection system according to claim 12, comprising a designation step for designating a predetermined position in the predetermined area while the display unit displays the elevation difference in the predetermined area, Wherein the image display step for displaying, on the display unit, at least either a numerical value indicating an elevation difference at the predetermined position when the designation step has designated the predetermined position.

14. The ground information detection system according to claim 11, comprising:

an image display step for displaying, on a display unit, a three-dimensional image based on the point group data the point group data acquisition step; wherein the image display step for displaying, on the three-dimensional image displayed on the display unit, a line indicating a portion having an identical elevation difference in the predetermined area in accordance with a magnitude of the elevation difference calculated by the elevation difference calculation step.

15. The ground information detection system according to claim 14, comprising a designation step for determining a predetermined position in the predetermined area while the display unit displays the elevation difference in the predetermined area,
    wherein the image display step for displaying, on the display unit, a numerical value indicating a size of an area surrounded by a line indicating a portion having an identical elevation difference near the predetermined position when the designation means has designated the predetermined position.

16. The ground information detection system according to claim 11, comprising:
    a comparison step for comparing a magnitude of the elevation difference calculated by the elevation difference calculation step with a predetermined value for each identical plane position in the predetermined area;
    a first ratio calculation step for calculating, based on a comparison result by the comparison unit, at least either a ratio of plane positions having the magnitude of the elevation difference more than the predetermined value or a ratio of plane positions having the magnitude of the elevation difference equal to or less than the predetermined value; and
    a first determination step for determining a state of the predetermined area based on the ratio calculated by the first ratio calculation step.

17. The ground information detection system according to claim 16, comprising:
    an image display step for displaying, on a display unit, a three-dimensional image based on the point group data acquired in the point group data acquisition step; and
    a second color determination step for determining, for the each plane position, a color corresponding to either the plane position having the magnitude of the elevation difference more than the predetermined value or the plane position having the magnitude of the elevation difference equal to or less than the predetermined value, wherein
    the image display step for displaying adds the color determined by the second color determination step to the three-dimensional image displayed on the display unit by the image display step to display the elevation difference in the predetermined area.

18. The ground information detection system according to claim 11, comprising:
    a comparison step for comparing a magnitude of the elevation difference calculated by the elevation difference calculation step with a predetermined value for each identical plane position in the predetermined area;
    a second ratio calculation step for calculating, based on a comparison result by the comparison step, at least either a ratio of plane positions that have the magnitude of the elevation difference more than the predetermined value and that have the magnitude of the elevation difference in a first predetermined range or a ratio of plane positions that have the magnitude of the elevation difference equal to or less than the predetermined value and that have the magnitude of the elevation difference in a second predetermined range; and
    a second determination step for determining a state of the predetermined area based on the ratio calculated by the second ratio calculation step.

19. The ground information detection system according to claim 11, comprising:
    an image display step for displaying, on a display unit, a three-dimensional image based on the point group data acquired in the point group data acquisition step; and
    a third color determination step for determining, for the each plane position, a color corresponding to either the plane position having the magnitude of the elevation difference in the first predetermined range or the plane position having the magnitude of the elevation difference in the second predetermined range, wherein
    an image display step for displaying adds the color determined by the third color determination step to the three-dimensional image displayed by the image display means to display the elevation difference in the predetermined area.

20. The ground information detection system according to claim 11, comprising:
    a comparison step for comparing a magnitude of the elevation difference calculated by the elevation difference calculation step with a predetermined value for each identical plane position in the predetermined area;
    a third ratio calculation step for calculating, based on a comparison result by the comparison step, a ratio of boundary portions between the plane position having the magnitude of the elevation difference more than the predetermined value and the plane position having the magnitude of the elevation difference equal to or less than the predetermined value; and
    a third determination step for determining a state of the predetermined area based on the ratio calculated by the third ratio calculation step.

* * * * *